(12) United States Patent
Tamura

(10) Patent No.: US 8,895,151 B2
(45) Date of Patent: *Nov. 25, 2014

(54) HEAT INSULATING MEMBER, HEAT INSULATING LAMINATED GLASS, AND HEAT INSULATING LAMINATED GLASS ARTICLE

(75) Inventor: Kentaro Tamura, Tokyo (JP)

(73) Assignee: Zeon Corporation, Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 13/582,915

(22) PCT Filed: Feb. 24, 2011

(86) PCT No.: PCT/JP2011/054180
§ 371 (c)(1),
(2), (4) Date: Sep. 5, 2012

(87) PCT Pub. No.: WO2011/111548
PCT Pub. Date: Sep. 15, 2011

(65) Prior Publication Data
US 2012/0327318 A1 Dec. 27, 2012

(30) Foreign Application Priority Data
Mar. 9, 2010 (JP) ................. 2010-052002

(51) Int. Cl.
| | | |
|---|---|---|
| *B32B 17/10* | (2006.01) | |
| *B32B 27/14* | (2006.01) | |
| *C09K 19/22* | (2006.01) | |
| *C09K 19/54* | (2006.01) | |
| *B32B 7/02* | (2006.01) | |
| *B32B 27/20* | (2006.01) | |

(52) U.S. Cl.
CPC ..... *B32B 17/10788* (2013.01); *B32B 17/10633* (2013.01); *B32B 7/02* (2013.01); *B32B 2419/00* (2013.01); *B32B 2307/306* (2013.01); *B32B 17/10036* (2013.01); *B32B 27/20* (2013.01); *B32B 17/10761* (2013.01); *B32B 17/10458* (2013.01); *B32B 17/10651* (2013.01)
USPC .... 428/441; 428/430; 252/299.5; 252/299.68

(58) Field of Classification Search
USPC .................. 428/1.1, 1.3, 1.31, 480, 430, 441; 252/299.01, 299.5, 299.68; 349/16, 349/115
See application file for complete search history.

(56) References Cited

U.S. PATENT DOCUMENTS
| | | | |
|---|---|---|---|
| 2,367,661 A | 1/1945 | Agre | |
| 2,367,670 A | 1/1945 | Christ | |

(Continued)

FOREIGN PATENT DOCUMENTS
| | | |
|---|---|---|
| JP | 55-21479 A | 2/1980 |
| JP | 60-105667 A | 6/1985 |

(Continued)

OTHER PUBLICATIONS

International Search Report for PCT/JP2011/054180 dated May 24, 2011.

(Continued)

*Primary Examiner* — Shean C Wu
(74) *Attorney, Agent, or Firm* — Birch, Stewart, Kolasch & Birch, LLP

(57) ABSTRACT

A heat insulating member including at least one cholesteric resin layer having cholesteric regularity controlled such that, in a wavelength range of 800 nm to 2,500 nm, the cholesteric resin layer has a band of reflecting 40% or more of incident light with a wavelength width equal to or wider than 300 nm; and a binder layer containing a pigment, the heat insulating member having a yellow index of 2.0 or lower.

15 Claims, 3 Drawing Sheets

(56) References Cited

U.S. PATENT DOCUMENTS

| | | | |
|---|---|---|---|
| 2,448,828 A | 9/1948 | Renfrew | |
| 2,722,512 A | 11/1955 | Crandall | |
| 2,951,758 A | 9/1960 | Notley | |
| 3,046,127 A | 7/1962 | Barney et al. | |
| 3,549,367 A | 12/1970 | Chang et al. | |
| 4,212,970 A | 7/1980 | Iwasaki | |
| 4,239,850 A | 12/1980 | Kita et al. | |
| 4,293,435 A | 10/1981 | Portugall et al. | |
| 4,619,998 A | 10/1986 | Buhr | |
| 4,696,888 A | 9/1987 | Buhr | |
| 5,332,522 A | 7/1994 | Chen et al. | |
| 5,362,315 A * | 11/1994 | Muller-Rees et al. | 106/493 |
| 5,506,704 A | 4/1996 | Broer et al. | |
| 5,593,617 A | 1/1997 | Kelly et al. | |
| 5,793,456 A | 8/1998 | Broer et al. | |
| 6,180,028 B1 | 1/2001 | Hotaka et al. | |
| 6,207,770 B1 | 3/2001 | Coates et al. | |
| 6,217,792 B1 | 4/2001 | Parri et al. | |
| 6,410,130 B1 | 6/2002 | Schuhmacher et al. | |
| 6,468,444 B1 | 10/2002 | Meyer et al. | |
| 6,699,405 B2 | 3/2004 | Prechtl et al. | |
| 6,773,766 B2 | 8/2004 | Meyer et al. | |
| 6,800,337 B1 | 10/2004 | Siemensmeyer et al. | |
| 6,805,920 B2 | 10/2004 | Nakano et al. | |
| 6,879,362 B2 | 4/2005 | Kawabata | |
| 7,452,608 B2 | 11/2008 | Fukatani et al. | |
| 7,632,568 B2 | 12/2009 | Padiyath et al. | |
| 7,652,736 B2 | 1/2010 | Padiyath et al. | |
| 7,732,042 B2 | 6/2010 | Fukatani et al. | |
| 7,736,532 B2 | 6/2010 | Silverman et al. | |
| 7,744,970 B2 | 6/2010 | Silverman et al. | |
| 7,749,577 B2 | 7/2010 | Goldfinger et al. | |
| 7,754,912 B2 | 7/2010 | Irisawa et al. | |
| 7,771,616 B2 | 8/2010 | Irisawa et al. | |
| 8,158,021 B2 | 4/2012 | Sakamoto et al. | |
| 8,202,922 B2 | 6/2012 | Botel et al. | |
| 2007/0152188 A1 | 7/2007 | Silverman et al. | |
| 2009/0269502 A1 | 10/2009 | Kanno et al. | |
| 2010/0263790 A1 | 10/2010 | Goldfinger et al. | |
| 2012/0202084 A1* | 8/2012 | Tamura | 428/480 |
| 2013/0107191 A1* | 5/2013 | Tsai | 349/193 |

FOREIGN PATENT DOCUMENTS

| | | |
|---|---|---|
| JP | 62-70406 A | 3/1987 |
| JP | 6-220350 A | 8/1994 |
| JP | 6-281814 A | 10/1994 |
| JP | 8-104870 A | 4/1996 |
| JP | 8-209127 A | 8/1996 |
| JP | 11-100575 A | 4/1999 |
| JP | 11-130729 A | 5/1999 |
| JP | 2000-505485 A | 5/2000 |
| JP | 2001-515094 A | 9/2001 |
| JP | 2001262144 A * | 9/2001 |
| JP | 2001-519317 A | 10/2001 |
| JP | 2002-30042 A | 1/2002 |
| JP | 2002-265421 A | 9/2002 |
| JP | 2002-308832 A | 10/2002 |
| JP | 2002-533742 A | 10/2002 |
| JP | 2003-66214 A | 3/2003 |
| JP | 2003-131187 A | 5/2003 |
| JP | 2003-313187 A | 11/2003 |
| JP | 2004-204190 A | 7/2004 |
| JP | 2005-206445 A | 8/2005 |
| JP | 2005-263789 A | 9/2005 |
| JP | 2005-309255 A | 11/2005 |
| JP | 2007-119415 A | 5/2007 |
| JP | 2007-186430 A | 7/2007 |
| JP | 2008-170835 A | 7/2008 |
| JP | 2008-528313 A | 7/2008 |
| JP | 2008-242349 A | 10/2008 |
| JP | 2008-542065 A | 11/2008 |
| JP | 2008-291218 A | 12/2008 |
| JP | 2008-545556 A | 12/2008 |
| JP | 2009-514022 A | 4/2009 |
| JP | 2009-522399 A | 6/2009 |
| WO | WO 98/00428 A1 | 1/1998 |
| WO | WO 2008/007782 A1 | 1/2008 |
| WO | WO 2009/041512 A1 | 4/2009 |
| WO | WO 2009/133290 A2 | 11/2009 |
| WO | WO 2011/007796 A1 | 1/2011 |

OTHER PUBLICATIONS

International Search Report for PCT/JP2010/067959 dated Dec. 7, 2010.

The document titled JP-2009/041512-A1 is actually a machine translation of WO-2009/041512-A1, which published on Apr. 2, 2009.

U.S. Office Action dated Dec. 5, 2013, issued in copending U.S. Appl. No. 13/503,261.

U.S. Final Office Action dated May 13, 2014, issued in copending U.S. Appl. No. 13/503,261.

* cited by examiner

HEAT INSULATING MEMBER, HEAT INSULATING LAMINATED GLASS, AND HEAT INSULATING LAMINATED GLASS ARTICLE

FIELD

The present invention relates to a heat insulating member, a heat insulating laminated glass, and a heat insulating laminated glass article.

BACKGROUND

Conventionally, laminated glass has been used as, for example, window glass for vehicles. Generally, a laminated glass includes at least one pair of glass plates and an intermediate film such as a resin film disposed between the glass plates. Such a laminated glass has high safety because even if the glass is broken upon receiving impact, scattering of broken glass pieces is less likely to occur (see Patent Literature 1).

In recent years, from the viewpoint of improving air conditioning efficiency to promote energy saving, the development of films that block light in an infrared range (infrared radiation) is being advanced (Patent Literatures 2 and 3).

Citation List

Patent Literature

Patent Literature 1: Japanese Patent Application Laid-Open No. 2005-206445 A (corresponding European Patent Publication: EP1657092)

Patent Literature 2: Japanese Translation of PCT International Application No. 2008-528313 A (corresponding international publication: International Publication No. WO2006/074168)

Patent Literature 3: Japanese Translation of PCT International Application No. 2008-545556 A (corresponding international publication: International Publication No. WO2006/128090)

SUMMARY

Technical Problem

In the prior art technology, a layer containing particles that absorb infrared radiation is provided in an infrared blocking film in order to block infrared radiation. In Patent Literature 3, a twisted nematic liquid crystal layer having cholesteric infrared reflection properties is provided. However, a sufficient amount of infrared radiation cannot be blocked by providing only the twisted nematic liquid crystal layer. Therefore, even in the technology described in Patent Literature 3, a layer containing particles that absorb infrared radiation is also provided.

In order to block a sufficient amount of infrared radiation, the amount of particles that absorb infrared radiation must be increased. However, since a near infrared range contained in the infrared range is a wavelength range very close to the visible range, the particles that absorb near infrared radiation generally also absorb light in the visible range (visible light). Therefore, when the amount of the particles that absorb near infrared radiation is increased, the amount of visible light blocked also increases, and this results in a reduction in visible light transmittance.

From the viewpoint of improvement in appearance, there is a demand for adding a color to laminated glass. One possible method for adding a color to laminated glass is to provide, for example, a layer containing a pigment to the laminated glass. However, to obtain a color deep enough to be visually observed, a large amount of pigment is generally used. Since a pigment absorbs visible light, visible light transmittance is reduced when a color is added to laminated glass.

Generally, laminated glass is required to have high visible light transmittance. Particularly, there are regulations on windshields for automobiles so that their visible light transmittance is equal to or higher than a prescribed value. Therefore, also when laminated glass is designed to block infrared radiation and is colored as described above, there is a demand that the laminated glass should have visible light transmittance high enough for its application.

However, with the prior art technology, it is difficult to simultaneously achieve effective blocking of infrared radiation and coloration of laminated glass with a high degree of flexibility while high visible light transmittance is maintained. More specifically, to block infrared radiation effectively, a large amount of particles that absorb the infrared radiation are used. However, this may incur significant reduction in visible light transmittance. Therefore, there is only limited room to increase the amount of pigment, and usable colors and depth of the colors are limited. On the other hand, to add a color to laminated glass, the amount of pigment is increased. However, this may incur significant reduction in visible light transmittance. Therefore, there is only limited room to increase the amount of the particles that absorb infrared radiation (particularly, particles that absorb near infrared radiation), so that infrared radiation cannot be blocked sufficiently.

The present invention has been made in view of the aforementioned problems, and it is an object to provide a heat insulating member, a heat insulating laminated glass, and a heat insulating laminated glass article that have high visible light transmittance, can block infrared radiation effectively, and can be colored with a high degree of flexibility.

Solution to Problem

The present inventor has made extensive studies in order to solve the foregoing problems and found out that, when a cholesteric resin layer with its cholesteric regularity controlled such that infrared radiation can be reflected in a wide wavelength width in the infrared range is used, near infrared radiation can be blocked sufficiently without deterioration in visible light transmittance, and thus, even when a pigment is used for coloration, the visible light transmittance is not reduced excessively. In this manner, the present inventor has completed the present invention.

That is, according to the present invention, there is provided the following [1] to [15].

[1] A heat insulating member comprising:

at least one cholesteric resin layer having cholesteric regularity controlled such that, in a wavelength range of 800 nm to 2,500 nm, the cholesteric resin layer has a band of reflecting 40% or more of incident light with a wavelength width equal to or wider than 300 nm; and a binder layer containing a pigment, the heat insulating member having a yellow index of 2.0 or lower.

[2] The heat insulating member according to [1], comprising a resin layer containing inorganic fine particles.

[3] The heat insulating member according to [1] or [2], wherein a visible light transmittance of the heat insulating member is 60% or higher, and a solar radiation transmittance of the heat insulating member is 60% or lower.

[4] The heat insulating member according to any one of [1] to [3], wherein the heat insulating member comprises two cholesteric resin layers having the same twisting direction and the same cholesteric regularity, and the heat insulating member comprises a nematic resin layer between the two cholesteric resin layers.

[5] The heat insulating member according to [4], wherein a front retardation of the nematic resin layer at a wavelength of 550 nm is 400 nm or larger and 800 nm or smaller.

[6]. The heat insulating member according to any one of [1] to [5], wherein the pigment is at least one pigment selected from the group consisting of azo-based pigments, quinacridone-based pigments, diketo pyrrolole-based pigments, anthraquinone-based pigments, dioxazine-based pigments, and phthalocyanine-based pigments.

[7]. The heat insulating member according to any one of [1] to [6], wherein the cholesteric resin layer is a resin layer formed by curing a liquid crystal composition containing a liquid crystal compound having a refractive index anisotropy Δn of 0.21 or higher.

[8]. The heat insulating member according to any one of [1] to [7], wherein the cholesteric resin layer is formed from a liquid crystal composition containing a compound represented by the formula (1):

(in the formula (1), $R^1$ represents any one selected from the group consisting of a hydrogen atom, halogen atoms, alkyl groups having 1 to 10 carbon atoms, —$OR^3$, —O—C(=O)—$R^3$, and —C(=O)—$OR^3$, wherein $R^3$ represents a hydrogen atom or an alkyl group that has 1 to 10 carbon atoms and that may have a substituent, wherein, when $R^3$ is an alkyl group, at least one group selected from the group consisting of —O—, —S—, —O—C(=O)—, —C(=O)—O—, —O—C(=O)—O—, —$NR^4$—C(=O)—, —C(=O)—$NR^4$—, —$NR^4$—, —C(=O)—, and combinations thereof may lie in the alkyl group (excluding a case in which two or more —O—'s or —S—'s lie adjacently), wherein $R^4$ represents a hydrogen atom or an alkyl group having 1 to 6 carbon atoms, and n's each independently represent an integer of from 2 to 12).

[9]. The heat insulating member according to [4] or [5], wherein the nematic resin layer is formed from a liquid crystal composition containing a compound represented by the formula (1).

[10] The heat insulating member according to [8], wherein the compound represented by the formula (1) is a compound represented by the formula (2):

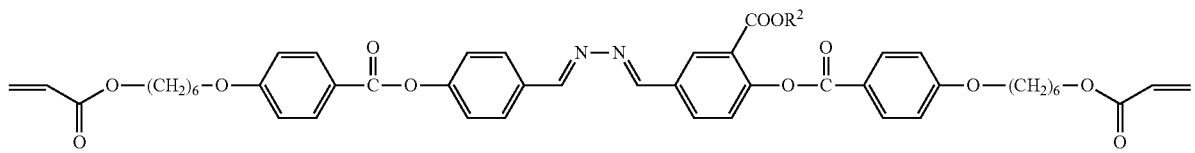

(2)

(in the formula (2), $R^2$ represents an alkyl group having 1 to 10 carbon atoms, and at least one group selected from the group consisting of —O—, —S—, —O—C(=O)—, —C(=O)—O—, and combinations thereof may lie in the alkyl group (excluding a case in which two or more —O—'s or —S—'s lie adjacently).

[11] The heat insulating member according to [9], wherein the compound represented by the formula (1) is a compound represented by the formula (2):

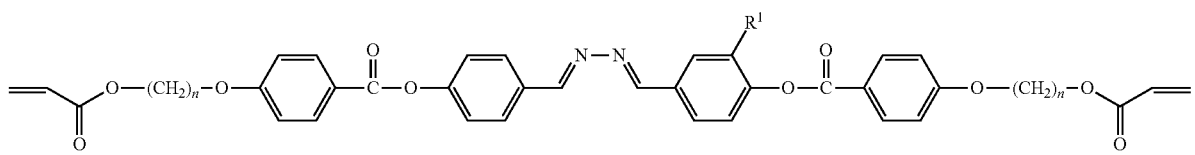

(1)

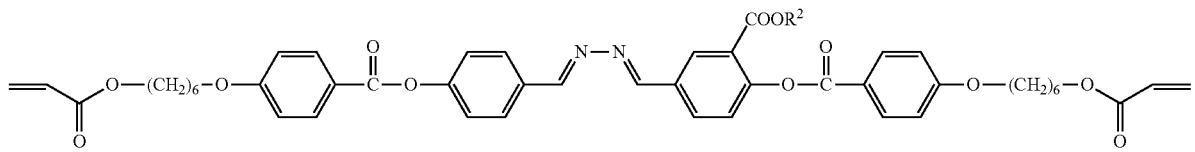

(2)

(in the formula (2), $R^2$ represents an alkyl group having 1 to 10 carbon atoms, and at least one group selected from the group consisting of —O—, —S—, —O—C(=O)—, —C(=O)—O—, and combinations thereof may lie in the alkyl group (excluding a case in which two or more —O—'s or —S—'s lie adjacently).

[12] The heat insulating member according to [2], wherein the inorganic fine particles are one or both of metal oxide fine particles and hexaboride fine particles.

[13] The heat insulating member according to [2] or [12], wherein the resin layer containing the inorganic fine particles contains polyvinyl butyral or an ethylene-vinyl acetate copolymer.

[14] A heat insulating laminated glass comprising:
two glass plates; and
the heat insulating member according to any one of [1] to [13], the heat insulating member being provided between the two glass plates.

[15] A heat insulating laminated glass article comprising:
two glass plates;
at least one cholesteric resin layer provided between the two glass plates and having cholesteric regularity controlled such that, in a wavelength range of 800 nm to 2,500 nm, the cholesteric resin layer has a band of reflecting 40% or more of incident light with a wavelength width equal to or wider than 300 nm;
a resin layer containing inorganic fine particles; and
a binder layer containing a pigment, wherein
at least one of the cholesteric resin layer is positioned between the resin layer containing the inorganic fine particles and an infrared source.

Advantageous Effects of Invention

The heat insulating member of the present invention has high visible light transmittance, can block infrared radiation effectively, and can be colored with a high degree of flexibility.

The heat insulating laminated glass of the present invention has high visible light transmittance, can block infrared radiation effectively, and can be colored with a high degree of flexibility.

The heat insulating laminated glass article of the present invention has high visible light transmittance, can block infrared radiation effectively, and can be colored with a high degree of flexibility.

DESCRIPTION OF EMBODIMENTS

Figure 1:
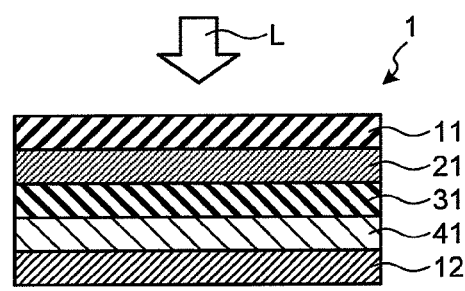
FIG. 1 is a schematic cross-sectional view illustrating the layer structure of a heat insulating laminated glass according to a first embodiment of the present invention.

The present invention will be described in detail by way of embodiments and examples. However, the present invention is not limited to these embodiments and examples and may be freely modified for implementation without departing from the scope of the claims of the present invention and equivalents thereof.

In the present description, unless otherwise specified, the visible range is a wavelength range of from 400 nm to 750 nm, the infrared range is a range of wavelength longer than the upper limit of the visible range, and the near infrared range is a wavelength range of from 800 nm to 1,300 nm.

[1. Summary]

The heat insulating member of the present invention includes at least: a cholesteric resin layer having cholesteric regularity controlled such that, in the wavelength range of 800 nm to 2,500 nm, the cholesteric resin layer has a band of reflecting 40% or more of incident light with a wavelength width equal to or wider than 300 nm (hereinafter, such a cholesteric resin layer is appropriately referred to as a "controlled cholesteric resin layer"); and a binder layer containing a pigment (hereinafter, such a binder layer is appropriately referred to as a "colored binder layer"). Generally, the heat insulating member of the present invention further includes a resin layer containing inorganic fine particles (hereinafter, such a resin layer is appropriately referred to as a "fine particle-containing resin layer"). The heat insulating member of the present invention is generally a sheet-shaped or film-shaped member and designed such that infrared radiation can be blocked effectively to provide a heat insulating effect.

The heat insulating member of the present invention is generally used as an intermediate film for heat insulating laminated glass. More specifically, the heat insulating member of the present invention is sandwiched between at least one pair of glass plates to form heat insulating laminated glass.

[2. Cholesteric Resin Layer]

The controlled cholesteric resin layer is a cholesteric resin layer having cholesteric regularity controlled such that, in the wavelength range of 800 nm to 2,500 nm, the cholesteric resin layer has a band of reflecting 40% or more of incident light with a wavelength width equal to or wider than 300 nm, as described above.

The "cholesteric regularity" is a structure in which angles of molecular axes are displaced (twisted) plane-by-plane about the normal direction of the planes in a manner such that the axes of molecules in one plane are oriented in a certain direction, and the axes of molecules in an adjacent plane are displaced by a small angle, and the angles of the axes of molecules in a subsequently adjacent plane are further displaced. Such a structure in which the directions of molecular axes are sequentially twisted is referred to as a chiral structure. Preferably, the normal to the planes (a chiral axis) is approximately parallel with respect to the thickness direction of the cholesteric resin layer.

The "cholesteric resin layer" is a resin layer having cholesteric regularity.

The phrase "having cholesteric regularity controlled such that, in the wavelength range of 800 nm to 2,500 nm, the cholesteric resin layer has a band of reflecting 40% or more of incident light with a bandwidth equal to or wider than 300 nm" means that the cholesteric resin layer is formed with the period of the cholesteric regularity being changed such that, in the wavelength range of 800 nm to 2,500 nm, the cholesteric resin layer has the band of reflecting 40% or more of incident light with a bandwidth equal to or wider than 300 nm. In the controlled cholesteric resin layer, the bandwidth of the band of reflecting 40% or more of incident light within the wavelength range of 800 nm to 2,500 nm is preferably equal to or wider than 350 nm and more preferably equal to or wider than 400 nm.

When light is incident on the cholesteric resin layer, only one of left-handed circularly polarized light or right-handed circularly polarized light in a particular wavelength range is reflected. Light other than the reflected circularly polarized light is transmitted through the cholesteric resin layer. The particular wavelength range in which circularly polarized light is reflected is a selective reflection band.

In the chiral structure, when a screw axis representing the rotation axis when the molecular axes are twisted is parallel with respect to the normal direction of the cholesteric resin layer, the pitch length p of the chiral structure and the wavelength λ of the reflected circularly polarized light satisfy the relations represented by the formulae (A) and (B).

$$\lambda_c = n \times p \times \cos\theta \quad \text{Formula (A):}$$

$$n_o \times p \times \cos\theta \leq \lambda \leq n_e \times p \times \cos\theta \quad \text{Formula (B):}$$

In the formulae (A) and (B), $\lambda_c$ represents the center wavelength in the selective reflection band, $n_o$ represents the refractive index of the liquid crystal compound in the minor axis direction, $n_e$ represents the refractive index of the liquid crystal compound in the major axis direction, n represents $(n_e+n_o)/2$, p represents the pitch length of the chiral structure, and θ represents the incident angle of light (the angle with respect to the normal direction of the planes).

Consequently, the center wavelength $\lambda_c$ of the selective reflection band depends on the pitch length p of the chiral structure in the cholesteric resin layer. The selective reflection band can be changed by changing the pitch length of the chiral structure.

With the inorganic fine particles used in Patent Literatures 2 and 3, a characteristic change in the ability to block light was obtained only in a broad region between the visible range and the near infrared range. Therefore, it has been difficult to block near infrared radiation efficiently while maintaining high visible light transmittance. However, the controlled cholesteric resin layer according to the present invention can efficiently reflect infrared radiation in the near infrared to mid-infrared range, i.e., 800 nm to 2,500 nm. Therefore, the heat insulating member of the present invention including the controlled cholesteric resin layer can efficiently block infrared radiation in the near infrared to mid-infrared range without using inorganic fine particles. The cholesteric resin layer reflects light in the selective reflection band efficiently and allows light in the other wavelength bands to pass therethrough. Therefore, the balance between visible light and near infrared radiation can be achieved, and infrared radiation can be blocked while high visible light transmittance is maintained. Therefore, the heat insulating member of the present invention can maintain its visible light transmittance at a high level even when colored with a pigment. Thus, the type and amount of the pigment can be selected with a high degree of flexibility, and the heat insulating member can be colored with a color and a depth that cannot be achieved with the prior art technology.

From the viewpoints such as the viewpoint of the prevention of disturbance in orientation and a reduction in transmittance and the viewpoint of the width of the wavelength range of selective reflection (reflection wavelength band), the thickness of the controlled cholesteric resin layer is generally 1 μm or larger and preferably 3 μm or larger and is generally 100 μm or smaller, preferably 50 μm or smaller, more preferably 20 μm or smaller, still more preferably 15 μm or smaller, and particularly preferably 10 μm or smaller.

The heat insulating member of the present invention may include one controlled cholesteric resin layer or two or more controlled cholesteric resin layers. It is preferable that the number of controlled cholesteric resin layers is two or more, because the wavelength bandwidth of possible light reflection can be widened, i.e., bandwidth broadening can be achieved.

When two or more controlled cholesteric resin layers are provided, it is preferable to use a combination of controlled cholesteric resin layers with different twisting directions of molecular axes. With a combination of a right-handed type controlled cholesteric resin layer and a left-handed type controlled cholesteric resin layer, one of right circularly polarized light and left circularly polarized light can be reflected by the right-handed controlled cholesteric resin layer, and the other circularly polarized light can be reflected by the left-handed controlled cholesteric resin layer. Therefore, both of the right circularly polarized light and the left circularly polarized light can be reflected. This allows broadening of the total bandwidth of the band reflecting 40% or more of incident light and also allows the reflectivity for incident infrared radiation to be 50% or higher in some wavelength range.

When two or more controlled cholesteric resin layers are provided, it is also preferable to use a combination of controlled cholesteric resin layers with the same twisting direction of molecular axes. However, in this case, it is preferable to provide a phase difference layer between the cholesteric resin layers with the same twisting direction. In this manner, one of the right circularly polarized light and left circularly polarized light in infrared radiation incident on the heat insulating member of the present invention is reflected by the first controlled cholesteric resin layer. Then the polarized state of the other circularly polarized light is converted by the phase difference layer, and the resultant circularly polarized light is reflected by the second controlled cholesteric resin layer. In this case, by setting the degree of front retardation that the phase difference layer expresses at the wavelength of infrared radiation to be reflected to one-half the wavelength of the aforementioned infrared radiation, both the right circularly polarized light and left circularly polarized light can be reflected in the same manner as in the case of the combination of controlled cholesteric resin layers with different twisting directions of molecular axes. This allows broadening of the total bandwidth of the band reflecting 40% or more of incident light and also allows the reflectivity for incident infrared radiation to be 50% or higher in some wavelength range.

No limitation is imposed on the method for producing the controlled cholesteric resin layer, so long as the cholesteric resin layer produced has cholesteric regularity controlled such that, in the wavelength range of 800 nm to 2,500 nm, the cholesteric resin layer has the band of reflecting 40% or more of incident light with a bandwidth equal to or wider than 300 nm. Generally, the controlled cholesteric resin layer is produced by preparing a liquid crystal composition containing a liquid crystal compound, applying the liquid crystal composition to a surface of a substrate, and curing it, if necessary, by drying and the like.

As the liquid crystal compound, a liquid crystal polymer being a polymer form, a polymerizable liquid crystal compound being a monomer form, or a combination thereof may be used. However, it is preferable that the liquid crystal compound used has a large refractive index anisotropy $\Delta n$. More specifically, the refractive index anisotropy $\Delta n$ is generally 0.21 or higher, preferably 0.22 or higher, and more preferably 0.23 or higher. As can be seen from the formula (B), since the bandwidth $\Delta\lambda$ of circularly polarized light that can be reflected depends on the difference between $n_e$ and $n_o$ and therefore depends on the refractive index anisotropy $\Delta\lambda$ of the liquid crystal compound, large refractive index anisotropy $\Delta n$ results in tendency in wide bandwidth $\Delta\lambda$ of the circularly polarized light that can be reflected. The larger the refractive index anisotropy $\Delta n$ of the liquid crystal compound, the more preferred. However, the refractive index anisotropy $\Delta n$ is practically 0.35 or lower.

Representative examples of the method for producing the controlled cholesteric resin layer may include the following method (a) and method (b).

Method (a): A liquid crystal composition is prepared by dissolving a liquid crystal polymer and, if necessary, a chiral agent, a surfactant, an orientation control agent, and the like in a solvent (hereinafter, this liquid crystal composition is appropriately referred to as a "liquid crystal polymer solution"). The prepared liquid crystal polymer solution is applied onto a substrate to be in a film form and then dried. In this method, the cholesteric regularity is controlled such that, in the wavelength range of 800 nm to 2,500 nm, the obtained coating layer has the band of reflecting 40% or more of incident light with a bandwidth equal to or wider than 300 nm.

Method (b): A liquid crystal composition is prepared by dissolving a polymerizable liquid crystal compound, a polymerization initiator, a chiral agent, and, if necessary, a surfactant, an orientation control agent, and the like in a solvent (hereinafter, this liquid crystal composition is appropriately referred to as a "polymerizable liquid crystal composition"). The prepared polymerizable liquid crystal composition is applied to a substrate in a film form and then dried. The obtained coating layer is subjected to polymerization, and then the cholesteric regularity is controlled such that, in the wavelength range of 800 nm to 2,500 nm, the resulting coating layer has the band of reflecting 40% or more of incident light with a bandwidth equal to or wider than 300 nm.

Among the methods (a) and (b), the method (b) is preferred because an intended controlled cholesteric resin layer can be formed more efficiently.

Each of the methods (a) and (b) will be described.
Description of Method (a)

In the method (a), a liquid crystal polymer and, if necessary a chiral agent, a surfactant, an orientation control agent, and the like are first dissolved in a solvent to prepare a liquid crystal polymer solution as a liquid crystal composition.
(Liquid Crystal Polymer)

Examples of the liquid crystal polymer used as a liquid crystal compound in the method (a) may include: a nematic liquid crystal polymer containing a low-molecular chiral agent; a liquid crystal polymer to which a chiral component has been introduced; and a mixture of a nematic liquid crystal polymer and a cholesteric liquid crystal polymer. The liquid crystal polymer to which a chiral component has been introduced is a liquid crystal polymer that itself serves as a chiral agent. In the mixture of a nematic liquid crystal polymer and a cholesteric liquid crystal polymer, the pitch of the chiral structure of the nematic liquid crystal polymer may be controlled by changing the mixing ratio.

As the liquid crystal polymer, it may also be possible to use a liquid crystal polymer having cholesteric regularity imparted, for example, by a method wherein a chiral component, a low-molecular chiral agent, and the like composed of a compound having an asymmetric carbon atom are introduced into a material including a para-substituted cyclic compound that provides nematic orientation and is composed of, for example, a para-substituted aromatic unit or a para-substituted cyclohexyl unit of, for example, the azomethine, azo, azoxy, ester, biphenyl, phenylcyclohexane, or bicyclohexane type (see Japanese Patent Application Laid-Open No. Sho. 55-21479 A and U.S. Pat. No. 5,332,522). Examples of the terminal substituents in para-positions in the para-substituted cyclic compound may include a cyano group, alkyl groups, and alkoxy groups.

As the liquid crystal polymer, one species thereof may be solely used, and a combination of two or more in any ratio may also be used.

No limitation is imposed on the method for producing the liquid crystal polymer. For example, the liquid crystal polymer is obtained by radical polymerization, cationic polymerization, or anionic polymerization of a monomer having a mesogenic structure. The monomer having a mesogenic structure may be obtained, for example, by introducing a mesogenic group into a vinyl-based monomer such as an acrylate or a methacrylate directly or through a spacer by a known method. The liquid crystal polymer may also be obtained, for example: by an addition reaction of a vinyl-substituted mesogenic monomer through Si—H bonds in polyoxymethylsilylene in the presence of a platinum-based catalyst; by introducing a mesogenic group through a functional group that has been added to a main chain polymer by an esterification reaction using a phase transfer catalyst; or by a polycondensation reaction of a diol and a monomer that has been obtained by introducing a mesogenic group into part of malonic acid, if necessary, through a spacer.
(Chiral Agent)

Any known chiral agent may be used as the chiral agent for introducing into the liquid crystal polymer as a chiral component, and for, if necessary, adding to the liquid crystal polymer solution. Examples of such a chiral agent may include a chiral monomer described in Japanese Patent Application Laid-Open No. Hei. 06-281814 A, a chiral agent described in Japanese Patent Application Laid-Open No. Hei.

08-209127 A, and a photo-reactive chiral compound described in Japanese Patent Application Laid-Open No. 2003-131187 A.

In order to avoid an unexpected change in phase transition temperature caused by the chiral agent, it is preferable that the chiral agent itself exhibits liquid crystalline properties. From the viewpoint of economical efficiency, it is preferable to use a chiral agent having large HTP (=1p·c), which is an index of the efficiency of twisting the liquid crystal polymer. Here, p represents the pitch length of the chiral structure, and c represents the concentration of the chiral agent. The pitch length of the chiral structure is a distance in the chiral axis direction from a plane in the chiral structure to another plane in which the molecular axis direction that is displaced in angle plane-by-plane returns to the original molecular axis direction.

As to the chiral agent, one species thereof may be solely used, and a combination of two or more in any ratio may also be used.

The specific type and amount of the chiral agent may be set such that the resulting controlled cholesteric resin layer has desired optical properties.

(Formation of Film of Liquid Crystal Polymer Solution)

In the method (a), the prepared liquid crystal polymer solution is applied to a substrate in a film form and then dried to obtain a controlled cholesteric resin layer as a coating layer.

The substrate used may be a substrate formed of any of organic and inorganic materials. A transparent substrate is preferred. The term "transparent" means that the total light transmittance at a thickness of 1 mm is 80% or higher.

Examples of the material of the transparent substrate may include: transparent resin substrates such as polycycloolefin (for example, ZEONEX (registered trademark) and ZEONOR (registered trademark) (products of ZEON CORPORATION), ARTON (registered trademark) (a product of JSR Corporation), APEL (registered trademark) (a product of Mitsui Chemicals, Inc.)), polyethylene terephthalate, polycarbonate, polyimide, polyamide, polymethyl methacrylate, polystyrene, polyvinyl chloride, polytetrafluoroethylene, cellulose, cellulose triacetate, and polyether sulfone as organic materials; and silicon, glass, and calcite as inorganic materials. Of these, organic materials are preferred.

A film-shaped substrate is generally used as the substrate. Such a substrate may be a single layer substrate or a multilayer substrate. When a multilayer substrate is used, the multilayer substrate may be a combination of organic and inorganic materials, a combination of only organic materials, or a combination of only inorganic materials.

An orientation film may be used to form the controlled cholesteric resin layer. The orientation film is generally formed on the surface of the substrate for regulating the orientation in one in-plane direction in the cholesteric resin layer having cholesteric regularity.

The orientation film contains a polymer such as polyimide, polyvinyl alcohol, polyester, polyarylate, polyamide imide, polyether imide, or polyamide. The orientation film is obtained by, for example, applying a solution containing such a polymer (a composition for the orientation film) to a substrate to form a film, drying the film, and subjecting the film to rubbing treatment in one direction. As to the material for the orientation film, one species thereof may be solely used, and a combination of two or more species thereof in any ratio may also be used.

The thickness of the orientation film is generally 0.01 μm or larger and preferably 0.05 μm or larger and is generally 5 μm or smaller and preferably 1 μm or smaller.

In the method (a), the orientation film or the substrate may be subjected to rubbing treatment before the application of the liquid crystal polymer solution. No particular limitation is imposed on the method of rubbing treatment. In one exemplary rubbing treatment method, the orientation film is rubbed in one direction with a roller wound with felt or cloth composed of synthetic fibers such as nylon or natural fibers such as cotton. In order to remove fine powder (unwanted matter) generated during rubbing treatment and make the surface of the orientation film clean, it is preferable to clean the orientation film with, for example, isopropyl alcohol after rubbing treatment.

The function of controlling the orientation of the cholesteric resin layer having cholesteric regularity in one plane direction can be given to the orientation film not only by the rubbing treatment method but also a method including irradiating the surface of the orientation film with polarized UV light.

In the method (a), no limitation is imposed on the method for applying the liquid crystal polymer solution to a substrate to form a film. Examples of the method may include known coating methods such as spin coating, roller coating, flow coating, printing, dip coating, flow casting film forming, bar coating, die coating, and gravure printing.

The applied liquid crystal polymer solution may be dried to obtain a controlled cholesteric resin layer containing the liquid crystal polymer as a cured coating layer. The temperature of drying is generally in the range of 40° C. to 150° C.

In the method (a), in order to control the cholesteric regularity of the liquid crystal polymer layer formed as a film on the substrate such that, in the wavelength range of 800 nm to 2,500 nm, the liquid crystal polymer layer has the band of reflecting 40% or more of incident light with a bandwidth equal to or wider than 300 nm, the type and amount of the chiral agent added to the liquid crystal polymer solution may be appropriately set, or the chiral component to be introduced into the liquid crystal polymer may be suitably selected. When a mixture of a nematic liquid crystal polymer and a cholesteric liquid crystal polymer is used, the pitch of the chiral structure of the nematic liquid crystal polymer can be controlled by changing the mixing ratio.

Description of Method (b)

In the method (b), a polymerizable liquid crystal composition is first prepared as a liquid crystal composition obtained by dissolving a polymerizable liquid crystal compound, a polymerization initiator, a chiral agent, and, if necessary, a surfactant, an orientation control agent, and the like in a solvent.

(Polymerizable Liquid Crystal Compound)

Examples of the polymerizable liquid crystal compound used as a liquid crystal compound in the method (b) may include those described in Japanese Patent Application Laid-Open Nos. Hei. 11-130729 A, Hei. 08-104870 A, 2005-309255 A, 2005-263789 A, 2002-308832 A, 2002-265421 A, Sho. 62-070406 A, Hei. 11-100575 A, 2008-291218 A, and 2008-242349 A, Japanese Translation of PCT International Application Nos. 2001-519317 A and 2002-533742 A, International Publication No. WO2009/133290, and Japanese Patent Application No. 2008-170835.

Of these, a compound represented by the following formula (1) is preferred.

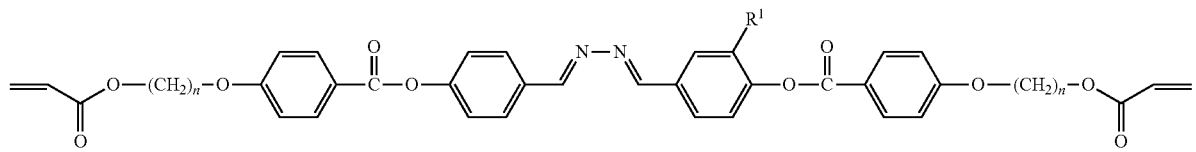

(1)

In the formula (1), $R^1$ represents any one selected from the group consisting of: a hydrogen atom; halogen atoms such as a fluorine atom, a chlorine atom, and a bromine atom; alkyl groups having 1 to 10 carbon atoms such as a methyl group, an ethyl group, a n-propyl group, an isopropyl group, a n-butyl group, an isobutyl group, a t-butyl group, a n-pentyl group, a n-hexyl group, and a n-heptyl group; $-OR^3$; $-O-C(=O)-R^3$; and $-C(=O)-OR^3$.

Here, $R^3$ represents a hydrogen atom or an alkyl group that has 1 to 10 carbon atoms and that may have a substituent. When $R^3$ is an alkyl group that has 1 to 10 carbon atoms and that may have a substituent, examples of the alkyl group having 1 to 10 carbon atoms may include a methyl group, an ethyl group, a n-propyl group, an isopropyl group, a n-butyl group, a sec-butyl group, a t-butyl group, a n-pentyl group, and a n-hexyl group. Of these, alkyl groups having 1 to 4 carbon atoms such as a methyl group, an ethyl group, an n-propyl group, an isopropyl group, and a n-butyl group are preferred.

When $R^3$ is an alkyl group that has 1 to 10 carbon atoms and that may have a substituent, examples of the substituent that the alkyl group may have may include: halogen atoms such as a fluorine atom, a chlorine atom, a bromine atom, and an iodine atom; and alkoxy groups having 1 to 6 carbon atoms such as a methoxy group, an ethoxy group, a n-propoxy group, an isopropoxy group, a n-butoxy group, a sec-butoxy group, a t-butoxy group, a n-pentyloxy group, and a n-hexyloxy group. The number of substituents contained in the alkyl group may be one or two or more, and the number of types of substituents contained in the alkyl group may be one or two or more.

When $R^3$ is an alkyl group, one or more groups selected from the group consisting of $-O-$, $-S-$, $-O-C(=O)-$, $-C(=O)-O-$, $-O-C(=O)-O-$, $-NR^4-C(=O)-$, $-C(=O)-NR^4-$, $-NR^4-$, $-C(=O)-$, and combinations thereof may lie in the alkyl group (excluding the case in which two or more $-O-$'s or $-S-$'s are lie adjacently).

$R^4$ represents a hydrogen atom or an alkyl group having 1 to 6 carbon atoms such as a methyl group, an ethyl group, a n-propyl group, an isopropyl group, a n-butyl group, a sec-butyl group, a t-butyl group, a n-pentyl group, or a n-hexyl group.

Each n independently represents an integer from 2 to 12 and is preferably 6.

Particularly, $R^1$ is preferably a group represented by $-C(=O)-OR^2$. $R^2$ represents an alkyl group having 1 to 10 carbon atoms, and one group or two or more groups selected from the group consisting of $-O-$, $-S-$, $-O-C(=O)-$, $-C(=O)-O-$, and combinations thereof may lie in the alkyl group (excluding the case in which two or more $-O-$'s or $-S-$'s lie adjacently). Particularly, $R^2$ is preferably a methyl group.

Therefore, the compound represented by the formula (1) is preferably a compound represented by the following formula (2). $R^2$ in the formula (2) is the same as that in the formula (1).

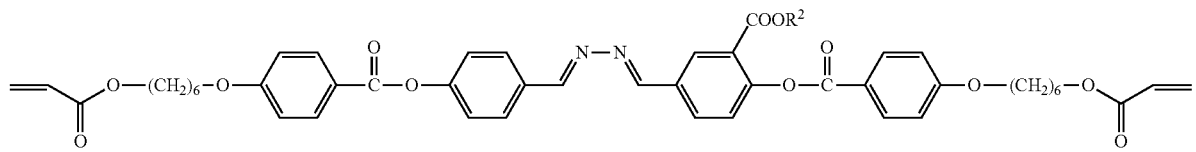

(2)

As the polymerizable liquid crystal compound, one species thereof may be solely used, and a combination of two or more thereof in any ratio may also be used.

The compound represented by the formula (1) may be produced by a combination of methods known in organic synthetic chemistry, for example, by a method described in Japanese Patent Application Laid-Open No. 2008-291218 A.

(Additional Copolymerizable Monomer)

In the method (b), the polymerizable liquid crystal compound is polymerized, whereby the controlled cholesteric resin layer is formed as a resin layer containing a polymer obtained by the polymerization (a liquid crystal macromolecule or a liquid crystal polymer). Examples of the polymer obtained by polymerization of the polymerizable liquid crystal compound may include a homopolymer obtained by homopolymerization of a polymerizable liquid crystal compound, a copolymer of two or more polymerizable liquid crystal compounds, and a copolymer of a polymerizable liquid crystal compound and an additional copolymerizable monomer (i.e., a monomer other than the polymerizable liquid crystal compound and copolymerizable with the polymerizable liquid crystal compound).

Examples of the copolymerizable monomer may include 4-(2-methacryloyloxyethyloxy)benzoic acid-4'-methoxyphenyl ester, 4-(6-methacryloyloxyhexyloxy)benzoic acid biphenyl ester, 4-(2-acryloyloxyethyloxy)benzoic acid-4'-cyanobiphenyl ester, 4-(2-methacryloyloxyethyloxy)benzoic acid-4'-cyanobiphenyl ester, 4-(2-methacryloyloxyethyloxy) benzoic acid-3',4'-difluorophenyl ester, 4-(2-methacryloyloxyethyloxy)benzoic acid naphthyl ester, 4-acryloyloxy-4'-decylbiphenyl, 4-acryloyloxy-4'-cyanobiphenyl, 4-(2-acryloyloxyethyloxy)-4'-cyanobiphenyl, 4-(2-methacryloyloxyethyloxy)-4'-methoxybiphenyl, 4-(2-methacryloyloxyethyloxy)-4'-(4''-fluorobenzyloxy)- biphenyl, 4-acryloyloxy-4'-propylcyclohexyl phenyl, 4-methacryloyl-4'-butylbicyclohexyl, 4-acryloyl-4'-amylto-lan, 4-acryloyl-4'-(3,4-difluorophenyl)bicyclohexyl, 4-(2-acryloyloxyethyl)benzoic acid (4-amylphenyl)ester, and 4-(2-acryloyloxyethyl)benzoic acid (4-(4'-propylcyclohexyl) phenyl)ester. As to the copolymerizable monomer, one species thereof may be solely used, and a combination of two or more species thereof in any ratio may also be used.

The amount of the copolymerizable monomer contained in the polymerizable liquid crystal composition is preferably 50 percent by weight or lower, and more preferably 30 percent by weight or lower, with respect to the total amount of polymerizable monomers (i.e., the total amount of the polymerizable liquid crystal compound and the copolymerizable monomer). In the aforementioned range, a polymer having a high glass transition temperature (Tg) and a high film hardness can be obtained by polymerization.

(Polymerization Initiator)

Any of a thermal polymerization initiator and a photo-polymerization initiator may be used as the polymerization initiator contained in the polymerizable liquid crystal composition. Of these, a photo-polymerization initiator is preferred because a controlled cholesteric resin layer having controlled cholesteric regularity can be obtained easily and efficiently.

Examples of the photo-polymerization initiator may include polynuclear quinone compounds (U.S. Pat. Nos. 3,046,127 and 2,951,758), oxadiazole compounds (U.S. Pat. No. 4,212,970), α-carbonyl compounds (U.S. Pat. Nos. 2,367,661 and 2,367,670), acyloin ethers (U.S. Pat. No. 2,448,828), α-hydrocarbon-substituted aromatic acyloin compounds (U.S. Pat. No. 2,722,512), a combination of a triarylimidazole dimer and p-aminophenyl ketone (U.S. Pat. No. 3,549,367), and acridine and phenazine compounds (Japanese Patent Application Laid-Open No. Sho. 60-105667 A and U.S. Pat. No. 4,239,850).

As to the polymerization initiator, one species thereof may be solely used, and a combination of two or more species thereof in any ratio may also be used.

The amount of the polymerization initiator contained in the polymerizable liquid crystal composition is generally 1 part by weight or larger and is generally 10 parts by weight or lower and preferably 5 parts by weight or lower, with respect to 100 parts by weight of the total amount of polymerizable monomers.

When a photo-polymerization initiator is used, irradiation with light is performed to initiate a polymerization reaction. As the irradiation light, UV light is preferably used. The energy of irradiation is preferably 0.1 mJ/cm$^2$ or higher and is preferably 50 J/cm$^2$ or lower and more preferably 800 mJ/cm$^2$ or lower. No particular limitation is imposed on the method for UV irradiation. The UV irradiation energy is appropriately selected in accordance with the type of polymerizable liquid crystal compound.

(Chiral Agent)

As the chiral agent to be added to the polymerizable liquid crystal composition, for example, any of those described in Japanese Patent Application Laid-Open Nos. 2003-66214 A and 2003-313187 A, U.S. Pat. No. 6,468,444, and a pamphlet of International Publication No. WO98/00428 may be appropriately used. Of these, a chiral agent having large HTP that is an index representing the efficiency of twisting the liquid crystal compound is preferred from the viewpoint of economic efficiency. The chiral agent may or may not exhibit liquid crystallinity so long as a liquid crystal layer having the desired cholesteric regularity can be formed. As to the chiral agent, one species thereof may be solely used, and a combination of two or more species thereof in any ratio may also be used.

The amount of the chiral agent contained in the polymerizable liquid crystal composition is generally 0.01 parts by weight or larger, preferably 0.1 parts by weight or larger, and more preferably 0.5 parts by weight or larger and is generally 35 parts by weight or lower, preferably 25 parts by weight or lower, and more preferably 15 parts by weight or lower, with respect to 100 parts by weight of the polymerizable liquid crystal compound being a liquid crystal compound. By setting the amount of the chiral agent within the aforementioned range, a liquid crystal layer having cholesteric regularity can be formed without any reduction in liquid crystallinity.

(Surfactant)

If necessary, the polymerizable liquid crystal composition may contain a surfactant. The surfactant is used for controlling the surface tension of the coating layer of the polymerizable liquid crystal composition. The surfactant is preferably a nonionic surfactant and also preferably an oligomer having a molecular weight of about several thousands. As to the surfactant, one species thereof may be solely used, and a combination of two or more species thereof in any ratio may also be used.

The amount of the surfactant contained in the polymerizable liquid crystal composition is generally 0.01 parts by weight or larger, preferably 0.03 parts by weight or larger, and more preferably 0.05 parts by weight or larger and is generally 10 parts by weight or lower, preferably 5 parts by weight or lower, and more preferably 1 part by weight or lower, with respect to 100 parts by weight of the polymerizable liquid crystal compound being a liquid crystal compound. By setting the amount of the surfactant within the aforementioned range, a liquid crystal layer having cholesteric regularity without any orientation defects can be formed.

(Solvent)

Examples of the solvent used for the polymerizable liquid crystal composition may include organic solvents such as ketones, alkyl halides, amides, sulfoxides, heterocyclic compounds, hydrocarbons, esters, and ethers. Of these, ketones are preferred in consideration of environmental loads. As to the solvent, one species thereof may be solely used, and a combination of two or more species thereof in any ratio may also be used.

The amount of the solvent contained in the polymerizable liquid crystal composition is generally 40 parts by weight or larger, preferably 60 parts by weight or larger, and more preferably 80 parts by weight or larger and is generally 1,000 parts by weight or lower, preferably 800 parts by weight or lower, and more preferably 600 parts by weight or lower, with respect to 100 parts by weight of the polymerizable liquid crystal compound being a liquid crystal compound. By setting the amount of the solvent within the aforementioned range, application can be performed uniformly without any coating unevenness.

(Formation of Film of Polymerizable Liquid Crystal Composition)

In the method (b), the prepared polymerizable liquid crystal composition is applied to a substrate in a film form and then dried to obtain a coating layer. The substrate, coating method, and drying method used in the method (b) may be the same as those in the method (a).

(Polymerization and Control of Cholesteric Regularity)

In the method (b), the polymerizable components such as the polymerizable liquid crystal compound and the copolymerizable monomer are polymerized in the coating layer obtained by application and drying of the polymerizable liquid crystal composition. Then, the cholesteric regularity of the coating layer is controlled to obtain the controlled cholesteric resin layer. Preferably, the polymerization and the control of the cholesteric regularity described above are performed as in the method disclosed in International Publication No. WO2008/007782.

More specifically, the step of forming a photo-polymerizable coating layer by applying the polymerizable liquid crystal composition containing the photo-polymerization initiator as a polymerization initiator to the substrate in a film form and then drying the film (a coating layer formation step (I)), the step of irradiating the obtained coating layer with selective UV light (also referred to as band-broadening UV light) to polymerize the polymerizable liquid crystal composition (a selective UV irradiation step (II)), the step of changing the period of the cholesteric regularity of the coating layer (a cholesteric regularity-controlling step (III)), and the step of curing the coating layer (a coating layer-curing step (IV)) may be performed to form the controlled cholesteric resin layer. Preferably, in this procedure, the selective UV irradiation step (II) and the cholesteric regularity-controlling step (III) described above are repeated a plurality of times.

In the selective UV irradiation step (II), the coating layer is irradiated with selective UV light. The temperature during irradiation with selective UV light is generally 20 to 40° C. The integrated light amount of the selective UV light applied is generally 0.5 mJ/cm² or higher and less than 50 mJ/cm². The integrated light amount is measured on the surface of the substrate using a photometer having a peak sensitivity at the wavelength of the selective UV light (more specifically, having a peak sensitivity at, for example, 360 nm).

Since the aforementioned coating layer is a photo-polymerizable coating layer formed using the polymerizable liquid crystal composition containing the photo-polymerization initiator, the irradiation with selective UV light allows a polymerization reaction or a cross-linking reaction to proceed in the coating layer.

The selective UV light means UV light with its wavelength range or illuminance selectively controlled such that the degrees of cross-linking (or the degree of polymerization) of the polymerizable liquid crystal compound in the above-described photo-polymerizable coating layer can vary in the thickness direction of the coating layer. The irradiation with the selective UV light does not cause complete curing (100% polymerization) of the photo-polymerizable coating layer.

The irradiation with the selective UV light allows the degree of cross-linking of the liquid crystal in the coating layer to vary in the thickness direction of the coating layer, so that the cholesteric regularity can be easily controlled such that the band of reflecting 40% or more of incident light with a bandwidth of 200 nm or wider.

As the selective UV light used in the selective UV irradiation step (II), UV light with a width of a wavelength range of 100 nm or narrower is preferably used. More specifically, UV light having only wavelengths of 300 nm or longer and shorter than 400 nm is preferably used.

For example, a mercury lamp light source or a metal halide lamp light source may be used as the light source.

Preferably, in the selective UV irradiation step (II), the width of the wavelength range of the UV light is controlled to 100 nm or narrower using, for example, a band-pass filter, and the resultant UV light is applied under the irradiation conditions of 0.5 mJ/cm² or higher and lower than 50 mJ/cm², as described above. Under certain conditions, UV light may be used without controlling the width of the wavelength range. The width of the aforementioned wavelength range is a half-width (the width at one half of the peak value of transmittance).

Examples of the method for controlling the aforementioned wavelength range may include: a method in which a band-pass filter with a center wavelength of 365 nm is used; and a method in which the width of the wavelength range having the center thereof at the maximum absorption wavelength of the polymerization initiator contained in the coating layer is set to 100 nm or narrower.

The selective UV light may be applied from the coating layer side, from the substrate side, or from both the coating layer side and the substrate side. Preferably, from the viewpoint of reducing the inhibition of polymerization by oxygen, the selective UV light is applied from the substrate side. When the selective UV light is applied from the coating layer side, the stability of illuminance and irradiation time is controlled more accurately (generally within ±3%). Therefore, also from the viewpoint of productivity, it is preferable to apply the selective UV light from the substrate side.

When the selective UV light is applied from the substrate side, it is preferable to perform, before the selective UV irradiation step (II), the step of cooling the coating layer on the substrate so that the temperature of the coating layer becomes 20° C. to 40° C. By applying the selective UV light to the coating layer maintained at 20° C. to 40° C., the light intensity is distributed in the thickness direction of the coating layer, whereby a cholesteric resin layer with the degree of cross-linking varying in the thickness direction of the coating layer can be formed. Examples of the method for cooling the coating layer may include cooling by supplying cool air and cooling using a cooling roller.

After the selective UV irradiation step (II), the cholesteric regularity-controlling step (III) of changing the period of the cholesteric regularity of the coating layer is performed. The phrase "changing the period of the cholesteric regularity of the coating layer" means that the pitch of the cholesteric resin layer having cholesteric regularity is changed in the thickness direction.

Examples of the method for changing the period of the cholesteric regularity may include: (i) a method in which the coating layer is subjected to heat treatment at a temperature equal to or higher than the temperature at which a liquid crystal phase appears; (ii) a method in which the liquid crystal compound is further applied to the aforementioned coating layer; and (iii) a method in which a non-liquid crystal compound is further applied to the aforementioned coating layer. One of these methods may be performed only once or may be repeated two or more times. Alternatively, a combination of two or more methods may be performed.

Among the methods (i) to (iii), the method (i) is preferred because of its simple procedure and effectiveness. In consideration of productivity and the effectiveness of band broadening, the heat treatment conditions in the method (i) are generally a temperature of 50 to 115° C. for 0.001 to 20 minutes, preferably a temperature of 65 to 115° C. for 0.001 to 10 minutes, and more preferably a temperature of 65 to 115° C. for 0.01 to 5 minutes. However, since the temperature range in which a liquid crystal phase appears varies depending on the type of the liquid crystal compound forming the coating layer, the treatment temperature and the treatment time vary accordingly.

Preferably, the selective UV irradiation step (II) and the cholesteric regularity-controlling step (III) described above are repeated a plurality of times. By repeating these steps a plurality of times, the pitch of the chiral structure of the cholesteric resin layer can be changed more largely. The conditions for irradiation with the selective UV light and for the control of the cholesteric regularity are appropriately adjusted each time to control the reflection band. No limitation is imposed on the number of repetitions. The number of repetitions is preferably 2 or larger and 4 or smaller, from the viewpoint of productivity and the facility used. If the number of repetitions is 5 or larger, a large scale facility is required, and this may cause a reduction in productivity.

The term "repetitions" of the selective UV irradiation step (II) and the cholesteric regularity-controlling step (III) means that a sequence including the execution of the selective UV irradiation step (II) and the subsequent execution of the cholesteric regularity-controlling step (III) is repeated. More specifically, when the selective UV irradiation step (II) and the cholesteric regularity-controlling step (III) are repeated twice, the steps (II)-(III)-(II)-(III) are performed in this order. Another step such as the cooling step described above may be performed between these steps.

Next, the coating layer is cured (the coating layer-curing step (IV)). No particular limitation is imposed on the curing method so long as the coating layer is cured and cholesteric regularity appears. However, a method in which main curing UV light is applied at an integrated light amount of 10 mJ/cm$^2$ or higher is preferred. The main curing UV light means UV light with its wavelength range or illuminance being set such that the coating layer can be completely cured.

The integrated light amount of the main curing UV light is preferably 10 mJ/cm$^2$ or higher and more preferably 50 mJ/cm$^2$ or higher and is preferably 1,000 mJ/cm$^2$ or lower and more preferably 800 mJ/cm$^2$ or lower. The integrated light amount is measured on the surface of the substrate using a UV actinometer. Alternatively, the illuminance is measured using a photometer, and the integrated light amount is calculated by multiplying the illuminance by time.

The main curing UV light may be applied from the coating layer side or the substrate side. It is preferable to apply the main curing UV light from the coating layer side because high UV irradiation efficiency is achieved.

Preferably, the irradiation with the main curing UV light is performed in an atmosphere, such as a nitrogen atmosphere, in which the amount of oxygen gas present therein is small. By performing the irradiation in such an atmosphere, the influence of inhibition of polymerization by oxygen can be reduced. The concentration of oxygen gas during irradiation with the main curing UV light is preferably 3% based on weight or smaller, more preferably 1% or smaller, and particularly preferably 500 ppm or smaller.

Preferably, the step of cooling the coating layer on the substrate to 20° C. to 40° C. is performed before the coating layer-curing step (IV). By applying the main curing UV light to the coating layer maintained at 20° C. to 40° C., the pitch of the cholesteric resin layer having cholesteric regularity after the cholesteric regularity-controlling step (III) can be maintained.

The coating layer-curing step (IV) allows the mechanical properties of the cholesteric resin layer having cholesteric regularity to be improved with its wide band being maintained. In this manner, a controlled cholesteric resin layer is thereby obtained.

A known coating forming apparatus may be suitably used for the above-described method for producing the controlled cholesteric resin layer. Examples of such an apparatus may include a coating forming apparatus comprising: a feeder for continuously feeding a substrate; a coating head for applying a liquid crystal composition to the substrate fed from the feeder to form a coating layer; and two or more systems each including cooling means for cooling the substrate having the coating layer formed thereon, a main curing UV irradiation unit and a selective UV irradiation unit for irradiating the coating layer with the main curing UV light and the selective UV light with its wavelength range and/or illuminance selected, and means for heating the substrate. No particular limitation is imposed on the feeder and the coating head of such a coating layer forming apparatus, and any known feeder and head may be used.

The cooling means used in the coating layer forming apparatus may be composed of, for example, a cooling zone unit or a cooling roller and is preferably composed of a cooling zone unit. The cooling means may be a device that surrounds part of a convey path for the substrate such that the temperature inside the surrounded part is maintained at a constant temperature suitable for the curing of the liquid crystal composition. Preferably, the entire part of the cooling means is disposed upstream of the selective UV irradiation unit and the main curing UV irradiation unit. More preferably, the cooling means is disposed immediately upstream of each of the selective UV irradiation unit and the main curing UV irradiation unit.

[3. Binder Layer]

The colored binder layer is a binder layer containing a pigment, as described above. The "binder layer" used herein is a layer formed of a binder used to bond layers constituting the heat insulating member of the present invention or to bond the heat insulating member of the present invention to another member. Further, the "binder" means an adhesive in a broad sense and means to encompass adhesives in narrow sense that lose their tack at room temperature after curing (for example, hot melt adhesives, UV curable adhesives, and EB curable adhesives) and adhesives that do not lose their tack at room temperature even after curing (for example, pressure-sensitive adhesives).

By adding a pigment to the colored binder layer, the heat insulating member of the present invention can be colored in a desired color. Since the pigment absorbs visible light, the visible light transmittance of the heat insulating member of the present invention is reduced to the extent corresponding to the amount of the pigment added. However, in the heat insulating member of the present invention, since near infrared radiation is blocked not by conventionally used infrared absorbing particles but by the selective cholesteric resin layer, high visible light transmittance can be maintained nevertheless having the function of blocking infrared radiation. Therefore, the type and amount of the pigment can be adjusted with a high degree of flexibility.

The pigment can be added to a layer other than the binder layer. However, when the pigment is added to the binder layer, the thickness of the heat insulating member of the present invention can be reduced.

No particular limitation is imposed on the binder, so long as it is transparent. Examples of the binder may include thermoplastic resin-based binders and thermosetting resin-based binders.

Examples of the thermoplastic resin-based binders may include vinyl acetate-based, polyvinyl alcohol-based, polyvinyl acetal-based, vinyl chloride-based, acrylic-based, polyamide-based, polyethylene-based, and cellulose-based binders. Of these, acrylic-based binders are preferred. As the main component of the acrylic-based binder, a copolymer with ethyl acrylate, butyl acrylate, 2-ethylhexyl acrylate, and the like with methacrylate, styrene, acrylonitrile, vinyl acetate, and the like is suitable.

Examples of the thermosetting resin-based binders may include melamine-based, phenol-based, resorcinol-based, polyester-based, polyurethane-based, epoxy-based, and polyaromatic-based binders. Of these, polyurethane-based or epoxy-based binders are preferred. Such a polyurethane-based binder contains, as a main component, a polymer obtained by reacting isocyanate with an excess amount of alcohol. The polyurethane-based binder is suitably used as a hot melt binder or a solvent soluble binder. The polyurethane-based binder is easily cured under heating or at room temperature using a curing agent such as an amine curing agent.

As to the binder, one species thereof may be solely used, and a combination of two or more species thereof in any ratio may also be used.

The form of use of such a binder may be a film, an aqueous solution, and an emulsion.

The pigment contained in the colored binder layer may be any of inorganic and organic pigments or a combination thereof, so long as the pigment is a material colored in a desired color. The specific type of the pigment may be selected in accordance with the color to be imparted to the heat insulating member of the present invention.

Examples of the inorganic pigment may include carbon black, metal oxides, metal sulfides, and metal chlorides.

Examples of the organic pigment may include azo-based pigments, phthalocyanine-based pigments, and fused polycyclic pigments. Examples of the azo-based pigment may include condensed azo pigments such as C.I. pigment red 220, C.I. pigment red 144, C.I. pigment red 214, and C.I. pigment red 221. Examples of the phthalocyanine-based pigment may include copper phthalocyanine pigments such as C.I. pigment blue 15:1, C.I. pigment blue 15:2, C.I. pigment blue 15:3, C.I. pigment blue 15:4, and C.I. pigment blue 15:6. Examples of the fused polycyclic pigment may include: anthraquinone-based pigments such as C.I. pigment red 177and C.I. pigment blue 60; perylene-based pigments such as C.I. pigment red 123; perinone-based pigments such as C.I. pigment orange 43; quinacridone-based pigments such as C.I. pigment red 202, C.I. pigment red 122, C.I. pigment red 282, and C.I. pigment violet 19; dioxazine-based pigments such as C.I. pigment violet 23 and C.I. pigment violet 37; isoindolinone-based pigments such as C.I. pigment yellow 109; isoindoline-based pigments such as C.I. pigment orange 66; quinophthalone-based pigments such as C.I. pigment yellow 138; indigo-based pigments such as C.I. pigment red 88; metal complex pigments such as C.I. pigment green 8; and diketo pyrrolo pyrrole-based pigments such as C.I. pigment red 254, C.I. pigment red 255, and C.I. pigment red 264. Of these, one or more pigments selected from the group consisting of azo-based pigments, quinacridone-based pigments, diketo pyrrolo pyrrole-based pigments, anthraquinone-based pigments, dioxazine-based pigments, and phthalocyanine-based pigments are preferred.

As to the pigment, one species thereof may be solely used, and a combination of two or more species thereof in any ratio may also be used.

As to the pigment, one species thereof may be solely used, and a combination of two or more species thereof in any ratio may also be used.

The amount of the pigment may be set in accordance with the depth of the color to be imparted to the heat insulating member of the present invention. The specific amount of the pigment varies depending on the type of the pigment, the type of the binder, the thickness of the colored binder layer, and the like. The amount of the pigment is generally 0.01 parts by weight or larger, preferably 0.05 parts by weight or larger, and more preferably 0.1 parts by weight or larger and is generally 30 parts by weight or smaller, preferably 20 parts by weight or smaller, and more preferably 10 parts by weight or smaller, with respect to 100 parts by weight of the binder.

If necessary, the colored binder layer may contain components other than the binder and the pigment. For example, the colored binder layer may contain inorganic particles and a UV absorber which will be described later, so long as the advantageous effects of the present invention are not significantly impaired.

Examples of the UV absorber may include salicylic acid-based, benzophenone-based, and benzotriazole-based UV absorbers. Specific examples of the salicylic acid-based UV absorber may include phenyl salicylate, p-t-butyl phenyl salicylate, and p-octyl phenyl salicylate. Specific examples of the benzophenone-based UV absorber may include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4,4'-dimethoxybenzophenone, and 2-hydroxy-4-methoxy-5-sulfobenzophenone. Specific examples of the benzotriazole-based UV absorber may include 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2-(2'-hydroxy-3'-(3",4",5",6"-tetrahydrophthalimidemethyl)-5'-methylphenyl)benzotriazole, 2,2-methylenebis[4-(1,1,3,3-tetramethylbutyl)-6-(2H-benzotriazole-2-yl)phenol], and 2(2'-hydroxy-5'-methacryloxyphenyl)-2H-benzotriazole. As to the UV absorber, one species thereof may be solely used, and a combination of two or more species thereof in any ratio may also be used. The amount of the UV absorber depends on the thickness of the binder layer and is generally 0.05 parts by weight or larger, and preferably 0.1 parts by weight or larger and is generally 30 parts by weight or smaller, and preferably 20 parts by weight or smaller, with respect to 100 parts by weight of the binder.

The thickness of the colored binder layer is generally 1 μm or larger, preferably 10 μm or larger, and more preferably 50 μm or larger and is generally 200 μm or smaller and preferably 150 μm or smaller.

[4. Resin Layer]

The fine particle-containing resin layer is a resin layer containing inorganic particles, as described above. When the heat insulating member of the present invention includes the resin layer, the heat insulating member of the present invention can be increased in strength and can thereby resist breakage. Even if the heat insulating member is broken, the broken pieces are less likely to be scattered, and the safety can thereby be improved. The feature that the broken pieces are less likely to be scattered is particularly useful when the heat insulating member of the present invention is applied to heat insulating laminated glass, as will be described later.

No particular limitation is imposed on the resin contained in the fine particle-containing resin layer, so long as the resin is transparent. Examples of such a resin may include: polyvinyl butyral; ethylene-vinyl acetate copolymers; alicyclic olefin polymers; chain olefin polymers such as polyethylene and polypropylene; triacetylcellulose; polyvinyl alcohol; polyimide; polyarylate; polyester; polycarbonate; polysulfone; polyether sulfone; modified acrylic polymers; epoxy resin; polystyrene; and acrylic resin. Of these, polyvinyl butyral, ethylene-vinyl acetate copolymers, and polyester are preferred.

As to the resin, one species thereof may be solely used, and a combination of two or more species thereof in any ratio may also be used.

The inorganic fine particles contained in the fine particle-containing resin layer generally absorb infrared radiation of wavelengths that depend on the type of the inorganic particles. Therefore, the use of the fine particle-containing resin layer containing the inorganic fine particles allows the heat insulating member of the present invention to more effectively block infrared radiation.

Preferably, the inorganic fine particles have an absorption peak at a wavelength longer than the wavelength of the band in which the controlled cholesteric resin layer reflects 40% or more of incident light. This allows infrared radiation in a wavelength range close to the visible range (mainly in the near infrared range) to be reflected by the controlled cholesteric resin layer and allows infrared radiation in a wavelength range longer than the aforementioned range (mainly in the mid-infrared range and the far infrared range) to be absorbed by the inorganic fine particles. Therefore, the entire infrared radiation including near infrared radiation, mid-infrared radiation, and far infrared radiation can be blocked, so that the heat insulating effect can be more effectively exerted. The inorganic fine particles having an absorption peak in a far longer wavelength range than the visible range do not have absorption in the visible range or absorb only a small amount of visible light, even if they absorb the visible light. Therefore, the visible light transmittance of the heat insulating member of the present invention is less likely to be reduced even when a large amount of the inorganic fine particles is contained in the fine particle-containing resin layer.

Examples of the inorganic fine particles that are preferred from the aforementioned viewpoint may include metal oxide fine particles and hexaboride fine particles. Examples of the metal oxide fine particles may include ATO (antimony-doped tin oxide) fine particles and ITO (tin-doped indium oxide) fine particles. Examples of the hexaboride fine particles may include lanthanum hexaboride fine particles. As to the inorganic fine particles, one species thereof may be solely used, and a combination of two or more species thereof in any ratio may also be used.

The median diameter based on volume of the inorganic fine particles is preferably 200 nm or smaller and more preferably 100 nm or smaller. If the median diameter is larger than 200 nm, the aggregates of the inorganic fine particles are more likely to be formed, which may cause haze to deteriorate transparency of the heat insulating member of the present invention. No particular limitation is imposed on the lower limit. The median diameter is generally 20 nm or larger. The median diameter based on volume can be measured using, for example, a laser diffraction-scattering type particle size distribution measurement apparatus.

The amount of the inorganic fine particles varies depending on the type of the resin, the type of the inorganic fine particles, the thickness of the fine particle-containing resin layer, and the like. The amount of the inorganic fine particles is generally 0.01 parts by weight or larger, preferably 0.05 parts by weight or larger, and more preferably 0.1 parts by weight or larger and is generally 50 parts by weight or smaller, preferably 40 parts by weight or smaller, and more preferably 30 parts by weight or smaller, with respect to 100 parts by weight of the resin.

If necessary, the fine particle-containing resin layer may contain components other than the resin and the inorganic fine particles.

The thickness of the fine particle-containing resin layer is generally 0.01 mm or larger, preferably 0.1 mm or larger, and more preferably 0.2 mm or larger and is generally 10 mm or smaller and preferably 5 mm or smaller.

[5. Nematic Resin Layer]

When the heat insulating member of the present invention includes two or more controlled cholesteric resin layers having the same twisting direction and the same cholesteric regularity, it is preferable that the heat insulating member of the present invention further includes a nematic resin layer between two controlled cholesteric resin layers described above. The "nematic resin layer" used herein is a resin layer having nematic regularity. The nematic resin layer is generally obtained by curing a nematic liquid crystal through polymerization or cross-linking. The nematic resin layer is generally a phase difference layer that expresses front retardation. Therefore, one of right circularly polarized light and left circularly polarized light in infrared radiation incident on the heat insulating member of the present invention is reflected by the first controlled cholesteric resin layer. Then the polarized state of the infrared radiation is converted by the nematic resin layer, and the resultant infrared radiation is reflected by the second controlled cholesteric resin layer. Thereby the bandwidth of the band reflecting 40% or more of incident light can be widened broader than the bandwidth of an instance wherein only one of the right circularly polarized light and left circularly polarized light is reflected, and a reflectivity for incident infrared radiation of 50% or higher can be achieved.

The degree of the front retardation that the nematic resin layer expresses at a wavelength of 550 nm is preferably 400 nm or larger, more preferably 450 nm or larger, and particularly preferably 500 nm or larger and is preferably 800 nm or smaller, more preferably 750 nm or smaller, and particularly preferably 700 nm or smaller. On account of this, the nematic resin layer expresses an approximately one-half wavelength front retardation of the infrared radiation in the selective reflection band that is reflected by the controlled cholesteric resin layers. Therefore, right circularly polarized light can be converted to left circularly polarized light, and left circularly polarized light can be converted to right circularly polarized light. The heat insulating member of the present invention can thereby reflect both the right circularly polarized light and the left circularly polarized light. Therefore, the bandwidth of the band reflecting 40% or more of incident light can be widened, and infrared radiation in the selective reflection band can be reflected at higher reflectivity.

Examples of the method for producing the nematic resin layer may include a method including: applying a nematic liquid crystal composition containing a rod-shaped liquid crystal compound having a polymerizable group to another layer, for example, preferably the orientation film, to obtain a nematic liquid crystal layer; and then curing the nematic liquid crystal layer by light irradiation and/or heat treatment performed once or more.

The rod-shaped liquid crystal compound may be the polymerizable liquid crystal compound represented by the formula (1) or may be any of known rod-shaped liquid crystal compounds having polymerizable groups and described in, for example, Japanese Patent Application Laid-Open Nos. 2002-030042 A, 2004-204190 A, 2005-263789 A, 2007-119415 A, and 2007-186430 A. As to the rod-shaped liquid crystal compound, one species thereof may be solely used, and a combination of two or more species thereof in any ratio may also be used. Of these, the polymerizable liquid crystal compound represented by the formula (1) is preferred, and the polymerizable liquid crystal compound represented by the formula (2) is particularly preferred.

In order to improve film strength and durability after curing, the nematic liquid crystal composition may contain a polymerization initiator. The same polymerization initiator as that used for the polymerizable liquid crystal composition described in the method for producing the cholesteric resin layer may be used in the same manner. As to the polymerization initiator, one species thereof may be solely used, and a combination of two or more species thereof in any ratio may also be used.

The nematic liquid crystal composition may contain a surfactant. The same surfactant as that used for the polymerizable liquid crystal composition described in the method for producing the cholesteric resin layer may be used in the same manner. As to the surfactant, one species thereof may be solely used, and a combination of two or more species thereof in any ratio may also be used.

If necessary, the nematic liquid crystal composition may further contain other components. Examples of such components may include a solvent, a cross-linking agent, a polymerization inhibitor for improving pot life, an anti-oxidant for improving durability, a UV absorber, and a light stabilizer. As to these optional component, one species thereof may be solely used, and a combination of two or more species thereof in any ratio may also be used.

Each of these components may be added in an amount that does not significantly impair the desirable optical performance.

No particular limitation is imposed on the method for producing the nematic liquid crystal composition. The nematic liquid crystal composition may be produced by mixing the respective components described above.

The prepared nematic liquid crystal composition is applied to another layer such as the orientation film to obtain a liquid crystal layer. The application may be performed using, for example, an extrusion coating method, a direct gravure coating method, a reverse gravure coating method, a die coating method, or a bar coating method.

The liquid crystal layer obtained by application described above is cured to obtain a nematic resin layer. Before the liquid crystal layer is cured, it may be subjected to orientation treatment if necessary. The orientation treatment may be performed, for example, by heating the liquid crystal layer at 50 to 150° C. for 0.5 to 10 minutes. By subjecting the liquid crystal layer to the orientation treatment, the liquid crystal layer can be oriented favorably.

The liquid crystal layer may be cured, for example, by performing light irradiation or heating treatment once or more, or by a combination thereof. Heating is performed, for example, under the conditions wherein the temperature is generally 40° C. or higher and preferably 50° C. or higher and is generally 200° C. or lower and preferably 140° C. or lower, and the time is generally 1 second or longer and preferably 5 seconds or longer and is generally 3 minutes or shorter and preferably 120 seconds or shorter. By curing the liquid crystal layer in this manner, the nematic resin layer can be obtained.

The thickness of the nematic resin layer may be set in accordance with the desired degree of front retardation and is generally 2 μm to 8 μm.

[6. Other Layers]

The heat insulating member of the present invention may further include components other than the controlled cholesteric resin layer, the colored binder layer, the fine particle-containing resin layer, and the nematic resin layer described above.

The heat insulating member of the present invention may further include, for example, a cholesteric resin layer other than the controlled cholesteric resin layer, a binder layer containing no pigment, a resin layer containing no inorganic fine particles, and the substrate and orientation film used to produce the cholesteric resin layer or the nematic resin layer. A peelable protective film may be provided in order to prevent the heat insulating member of the present invention from being damaged during storage and conveyance.

[7. Physical Properties and the Like of Heat Insulating Member of Present Invention]

The yellow index of the heat insulating member of the present invention is generally 2.0 or lower, preferably 1.8 or lower, and more preferably 1.6 or lower. No limitation is imposed on the lower limit of the yellow index. The yellow index is generally −10 or higher. In the heat insulating member of the present invention, near infrared radiation is blocked not by conventionally used particles that absorb infrared radiation but by the controlled cholesteric resin layer. Therefore, the amount of particles causing a yellow coloring can be reduced, and the low yellow index value can thereby be achieved.

The yellow index (YI) is determined from the following equation using a transmission spectrum measured at wavelengths of 380 nm to 780 nm using a UV-visible near infrared spectrophotometer.

$$YI=100(1.28X-1.06Z)/Y$$

In this equation, X, Y, and Z are the tristimulus values defined by the Commission Internationale de l'Eclairage.

The visible light transmittance of the heat insulating member of the present invention is generally 60% or higher, preferably 65% or higher, and more preferably 70% or higher. The upper limit of the visible light transmittance is ideally 100% and generally 99% or lower. Since the heat insulating member of the present invention blocks near infrared radiation by the function of the controlled cholesteric resin layer, the heat insulating member does not cause excessive reduction in the visible light transmittance, whereby the above-described high visible light transmittance can be achieved.

The visible light transmittance can be measured by the method described in JIS R3106.

The solar radiation transmittance of the heat insulating member of the present invention is generally 60% or lower, preferably 55% or lower, and more preferably 50% or lower. The lower limit of the solar radiation transmittance is preferably a value that allows the visible light transmittance to fall within the aforementioned range and is generally 10% or higher. Since the heat insulating member of the present invention can effectively block infrared radiation, the solar radiation transmittance can be reduced to at least the extent corresponding to the amount of blocked infrared radiation. In the heat insulating member of the present invention, infrared radiation is blocked not by absorption by particles as in the conventional case but by reflection by the cholesteric resin layer. Therefore, the degree of the increase in the temperature of the heat insulating member caused by light absorption is small.

The solar radiation transmittance can be measured by the method defined in JIS R3106.

The heat insulating member of the present invention is generally a sheet-shaped or film-shaped member but may be, for example, a plate-shaped member. The thickness of the heat insulating member of the present invention is generally 1 μm or larger, preferably 10 μm or larger, and more preferably 20 μm or larger and is generally 10 mm or smaller, preferably 5 mm or smaller, and more preferably 1 mm or smaller.

[8. Heat Insulating Laminated Glass]

A heat insulating laminated glass of the present invention includes at least two glass plates and the heat insulating member of the present invention provided between the two glass plates. More specifically, the heat insulating laminated glass of the present invention includes a glass plate, the heat insulating member of the present invention, and a glass plate in this order. The heat insulating member of the present invention functions as the intermediate film for the laminated glass.

The glass plates may be silicate glass plates, may be formed of glass other than silicate glass, or may be plates of special glass containing a component other than the glass component. Any combination of these glass plates may also be used. The specific type of the glass plates may be selected in accordance with the application of the heat insulating laminated glass of the present invention.

The heat insulating laminated glass of the present invention includes at least two glass plates and may include, for example, three or more glass plates.

The thickness of the glass plates may be set in accordance with the application and is generally 0.5 mm or larger and 30 mm or smaller.

The heat insulating laminated glass of the present invention includes the heat insulating member of the present invention that can effectively block infrared radiation. Therefore, heating by the infrared radiation can be suppressed, and a high heat insulating effect can be achieved.

Since the visible light transmittance of the heat insulating member of the present invention is high, the heat insulating laminated glass of the present invention including the heat insulating member can also have high visible light transmittance.

Since the heat insulating member of the present invention can be colored with a high degree of flexibility while high visible light transmittance and low solar radiation transmittance are maintained, the heat insulating laminated glass of the present invention including the heat insulating member can be colored with a high degree of flexibility without any deterioration in the excellent performance described above. Therefore, the heat insulating laminated glass of the present invention can be colored in a color that is difficult to achieve using conventional laminated glass having the effect of blocking infrared radiation. One significant advantage is that the heat insulating laminated glass can be colored in, for example, an achromatic color (neutral gray).

In the heat insulating laminated glass of the present invention, since the heat insulating member of the present invention functions as an intermediate film, the strength of the glass can be generally improved to provide resistance to breakage, and resistance to penetration and sound insulation can be improved.

When the heat insulating member of the present invention includes fine particle-containing resin layer and therefore the heat insulating laminated glass of the present invention also includes the fine particle-containing resin layer, it is preferable that, in a heat insulating laminated glass article including the heat insulating laminated glass, at least one controlled cholesteric resin layer is positioned between the fine particle-containing resin layer and an infrared source. The heat insulating laminated glass article is an object to which the heat insulating laminated glass of the present invention is applied, and examples thereof may include windows of vehicles and buildings, transparent wall materials, and transparent containers. Examples of the infrared source may include heating devices, but the infrared source generally means the sun. By disposing at least one controlled cholesteric resin layer at a position closer to the infrared source than the fine particle-containing resin layer, the infrared radiation emitted from the infrared source is first reflected by the controlled cholesteric resin layer, and the rest of the infrared radiation that has passed through the controlled cholesteric resin layer is incident on the fine particle-containing resin layer. In this manner, the energy of the infrared radiation absorbed by the fine particle-containing resin layer can be reduced, and the increase in temperature due to the absorption of the infrared radiation can be suppressed, so that the heat insulation effect can be improved. Generally, a heat insulating laminated glass article is used as an article that divides the inside of a space from the outside. Therefore, when the infrared source is the sun, the controlled cholesteric resin layer and the fine particle-containing resin layer may be disposed in this order from the outer side close to the sun. Consequently, the heat insulating laminated glass of the present invention may have a structure suitable for disposing one of the surfaces facing an infrared source such as the sun. For example, when the heat insulating laminated glass is used for the front or rear window of an automobile, the laminated glass may have a structure in which the surface facing the outside of the automobile is convex and the surface facing the inner side of the automobile is concave. In this case, the convex surface faces the infrared source. The heat insulating laminated glass of the present invention may have a structure in which at least one controlled cholesteric resin layer is disposed between the surface facing the infrared source and the fine particle-containing resin layer.

[9. Embodiments]

Embodiments of the heat insulating laminated glass of the present invention will be described with reference to the drawings.

(First Embodiment)

FIG. 1 is a schematic cross-sectional view illustrating the layer structure of a heat insulating laminated glass 1 according to a first embodiment of the present invention. As shown in FIG. 1, the heat insulating laminated glass 1 includes a first glass plate 11, a resin layer 21 containing no inorganic fine particles, a controlled cholesteric resin layer 31, a colored binder layer 41, and a second glass plate 12, in this order.

The heat insulating laminated glass 1 is configured as described above. Therefore, when sunlight L is applied from above in the figure, the sunlight L enters the glass 1 through the first glass plate 11. Then part of infrared radiation contained in the applied sunlight L is reflected by the controlled cholesteric resin layer 31, and the rest of the sunlight L exits through the second glass plate 12.

In this heat insulating laminated glass 1, since the controlled cholesteric resin layer 31 reflects infrared radiation, the transmittance of infrared radiation can be reduced, and the solar radiation transmittance can thereby be reduced. The controlled cholesteric resin layer 31 selectively reflects light in the infrared range, but its ability to block visible light is low. Therefore, with the heat insulating laminated glass 1, high visible light transmittance can be maintained. Since the colored binder layer 41 contains a pigment, the heat insulating laminated glass 1 can be colored in a desired color. In addition, since the ability of the controlled cholesteric resin layer 31 to block visible light is small, the type and amount of the pigment can be set with a high degree of flexibility.

(Second Embodiment)

Figure 2:
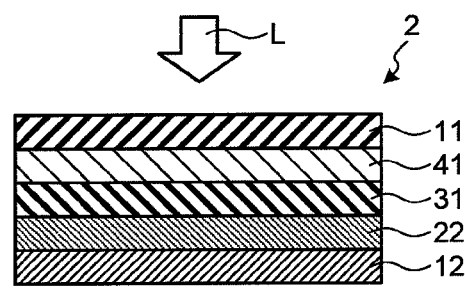
FIG. 2 is a schematic cross-sectional view illustrating the layer structure of a heat insulating laminated glass according to a second embodiment of the present invention.

FIG. 2 is a schematic cross-sectional view illustrating the layer structure of a heat insulating laminated glass 2 according to a second embodiment of the present invention. As shown in FIG. 2, the heat insulating laminated glass 2 includes a first glass plate 11, a colored binder layer 41, a controlled cholesteric resin layer 31, a fine particle-containing resin layer 22, and a second glass plate 12, in this order.

The heat insulating laminated glass 2 is configured as described above. Therefore, when sunlight L is applied from above in the figure, the sunlight L enters the laminated glass 2 through the first glass plate 11. Then part of infrared radiation contained in the applied sunlight L is reflected by the controlled cholesteric resin layer 31, and another part of the infrared radiation is absorbed by the inorganic fine particles in the fine particle-containing resin layer 22. The rest of the sunlight L exits through the second glass plate 12.

With this heat insulating laminated glass 2, the same advantageous effects as those of the heat insulating laminated glass 1 according to the first embodiment can be obtained. Since the inorganic fine particles contained in the fine particle-containing resin layer 22 can absorb infrared radiation, the transmittance for infrared radiation can be further reduced.

(Third Embodiment)

Figure 3:
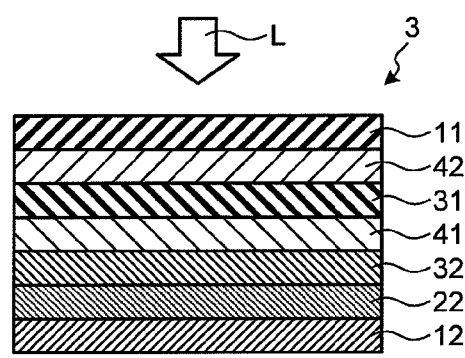
FIG. 3 is a schematic cross-sectional view illustrating the layer structure of a heat insulating laminated glass according to a third embodiment of the present invention.

FIG. 3 is a schematic cross-sectional view illustrating the layer structure of a heat insulating laminated glass 3 according to a third embodiment of the present invention. As shown in FIG. 3, the heat insulating laminated glass 3 includes a first glass plate 11, a binder layer 42 containing no pigment, a first controlled cholesteric resin layer 31, a colored binder layer 41, a second controlled cholesteric resin layer 32, a fine particle-containing resin layer 22, and a second glass plate 12, in this order.

The heat insulating laminated glass 3 is configured as described above. Therefore, when sunlight L is applied from above in the figure, the sunlight L enters the laminated glass 3 through the first glass plate 11. Then part of infrared radiation contained in the applied sunlight L is reflected by the first controlled cholesteric resin layer 31, and another part thereof is also reflected by the second controlled cholesteric resin layer 32. Another part of the infrared radiation is absorbed by the inorganic fine particles in the fine particle-containing resin layer 22, and the rest of the sunlight L exits through the second glass plate 12.

With this heat insulating laminated glass 3, the same advantageous effects as those of the heat insulating laminated glass 2 according to the second embodiment can be obtained. Since the heat insulating laminated glass 3 includes the two controlled cholesteric resin layers 31 and 32, the transmittance for infrared radiation can be further reduced. In this case, when the first controlled cholesteric resin layer 31 and the second controlled cholesteric resin layer 32 have the different twisting directions, both right circularly polarized light and left circularly polarized light can be reflected by the controlled cholesteric resin layers 31 and 32, and accordingly, the transmittance for infrared radiation can be particularly effectively reduced.

(Fourth Embodiment)

Figure 4:
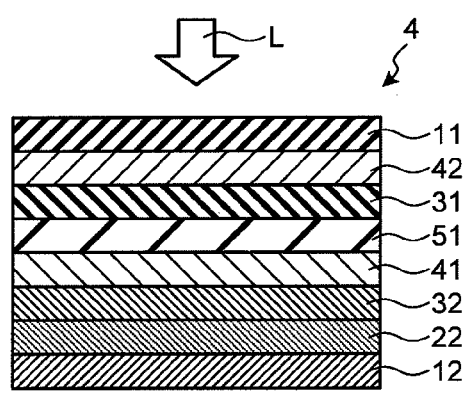
FIG. 4 is a schematic cross-sectional view illustrating the layer structure of a heat insulating laminated glass according to a fourth embodiment of the present invention.

FIG. 4 is a schematic cross-sectional view illustrating the layer structure of a heat insulating laminated glass 4 according to a fourth embodiment of the present invention. As shown in FIG. 4, the heat insulating laminated glass 4 includes a first glass plate 11, a binder layer 42 containing no pigment, a first controlled cholesteric resin layer 31, a nematic resin layer 51, a colored binder layer 41, a second controlled cholesteric resin layer 32, a fine particle-containing resin layer 22, and a second glass plate 12, in this order.

The heat insulating laminated glass 4 is configured as described above. Therefore, when sunlight L is applied from above in the figure, the sunlight L enters the laminated glass 4 through the first glass plate 11. Then part of infrared radiation contained in the applied sunlight L is reflected by the first controlled cholesteric resin layer 31. The polarized state of the rest of the infrared radiation is converted by the nematic resin layer 51, and part of the resultant infrared radiation is also reflected by the second controlled cholesteric resin layer 32. Another part of the infrared radiation is absorbed by the inorganic fine particles in the fine particle-containing resin layer 22, and the rest of the sunlight L exits through the second glass plate 12.

With this heat insulating laminated glass 4, the same advantageous effects as those of the heat insulating laminated glass 2 according to the second embodiment can be obtained. Since the heat insulating laminated glass 4 includes the two controlled cholesteric resin layers 31 and 32, the transmittance for infrared radiation can be further reduced. When the first controlled cholesteric resin layer 31 and the second controlled cholesteric resin layer 32 have the same twisting directions, a larger amount of polarized light can be reflected by the controlled cholesteric resin layers 31 and 32, and therefore the transmittance for infrared radiation can be effectively reduced. Particularly, when the nematic resin layer 51 can express a front retardation of approximately one-half wavelength to light in the selective reflection band of the controlled cholesteric resin layers 31 and 32, both right circularly polarized light and left circularly polarized light can be reflected, and this can significantly enhance the aforementioned advantageous effects.

(Fifth Embodiment)

Figure 5:
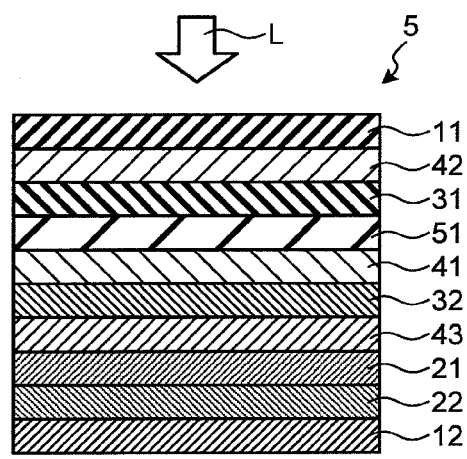
FIG. 5 is a schematic cross-sectional view illustrating the layer structure of a heat insulating laminated glass according to a fifth embodiment of the present invention.

FIG. 5 is a schematic cross-sectional view illustrating the layer structure of a heat insulating laminated glass 5 according to a fifth embodiment of the present invention. As shown in FIG. 5, the heat insulating laminated glass 5 includes a first glass plate 11, a binder layer 42 containing no pigment, a first controlled cholesteric resin layer 31, a nematic resin layer 51, a colored binder layer 41, a second controlled cholesteric resin layer 32, a binder layer 43 containing no pigment, a resin layer 21 containing no inorganic fine particles, a fine particle-containing resin layer 22, and a second glass plate 12, in this order.

The heat insulating laminated glass 5 is configured as described above. Therefore, when sunlight L is applied from above in the figure, the sunlight L enters the laminated glass 5 through the first glass plate 11. Then part of infrared radiation contained in the applied sunlight L is reflected by the first controlled cholesteric resin layer 31. The polarized state of the rest of the infrared radiation is converted by the nematic resin layer 51, and part of the resultant infrared radiation is also reflected by the second controlled cholesteric resin layer 32. Another part of the infrared radiation is absorbed by the inorganic fine particles in the fine particle-containing resin layer 22, and the rest of the sunlight L exits through the second glass plate 12.

With this heat insulating laminated glass 5, the same advantageous effects as those of the heat insulating laminated glass 4 according to the fourth embodiment can be obtained.

(Sixth Embodiment)

Figure 6:
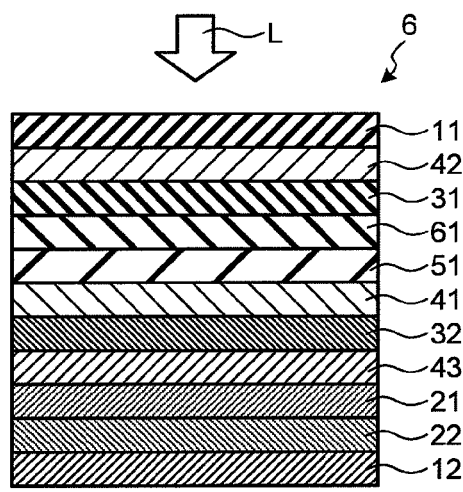
FIG. 6 is a schematic cross-sectional view illustrating the layer structure of a heat insulating laminated glass according to a sixth embodiment of the present invention.

FIG. 6 is a schematic cross-sectional view illustrating the layer structure of a heat insulating laminated glass 6 according to a sixth embodiment of the present invention. As shown in FIG. 6, the heat insulating laminated glass 6 includes a first glass plate 11, a binder layer 42 containing no pigment, a first controlled cholesteric resin layer 31, an orientation film 61 used to produce the first controlled cholesteric resin layer 31, a nematic resin layer 51, a colored binder layer 41, a second controlled cholesteric resin layer 32, a binder layer 43 containing no pigment, a resin layer 21 containing no inorganic fine particles, a fine particle-containing resin layer 22, and a second glass plate 12, in this order.

The heat insulating laminated glass 6 is configured as described above. Therefore, when sunlight L is applied from above in the figure, the sunlight L enters the laminated glass 6 through the first glass plate 11. Then part of infrared radiation contained in the applied sunlight L is reflected by the first controlled cholesteric resin layer 31. The polarized state of the rest of the infrared radiation is converted by the nematic resin layer 51, and part of the resultant infrared radiation is also reflected by the second controlled cholesteric resin layer 32. Another part of the infrared radiation is absorbed by the inorganic fine particles in the fine particle-containing resin layer 22, and the rest of the sunlight L exits through the second glass plate 12.

With this heat insulating laminated glass 6, the same advantageous effects as those of the heat insulating laminated glass 4 according to the fourth embodiment can be obtained.

(Others)

The configuration of the heat insulating laminated glass of the present invention is not limited to the configurations described in the aforementioned first to sixth embodiments.

A member having a configuration excluding the first and second glass plates 11 and 12 from any of the heat insulating laminated glasses 1 to 6 described in the first to sixth embodiments corresponds to the heat insulating member of the present invention. As described above, the heat insulating member of the present invention is generally combined with glass plates and used as an intermediate film for heat insulating laminated glass. However, the heat insulating member of the present invention may be used in combination with a member other than glass plates.

EXAMPLES

The present invention will be described specifically by way of Examples. However, the present invention is not limited to the following Examples and may be freely modified for implementation without departing from the scope of the claims of the present invention and equivalents thereof.

In the following Examples, "Me" represents a methyl group, and "Et" represents an ethyl group.

[Formation of Cholesteric Resin Layer]

Material components used were mixed in a mixing ratio shown in Table 1 to prepare a polymerizable liquid crystal composition A, in which the solid content thereof was about 40 percent by weight.

TABLE 1

| Constitution of Polymerizable liquid crystal composition | | |
|---|---|---|
| | Polymerizable liquid crystal composition A (parts by weight) | Polymerizable liquid crystal composition B (parts by weight) |
| Polymerizable liquid crystal compound (1) | 31 | — |
| Polymerizable liquid crystal compound (2) | — | 31 |
| Polymerizable non-liquid crystal compound | 7.7 | 7.7 |
| Chiral agent | 1.3 | 1.3 |
| Surfactant | 0.04 | 0.04 |
| Photo-polymerization initiator | 2 | 2 |
| Cyclopentanone | 60 | 60 |

As the polymerizable liquid crystal compound (1) shown in Table 1, a liquid crystal compound (refractive index anisotropy: $\Delta n=0.25$) having the following structure was used.

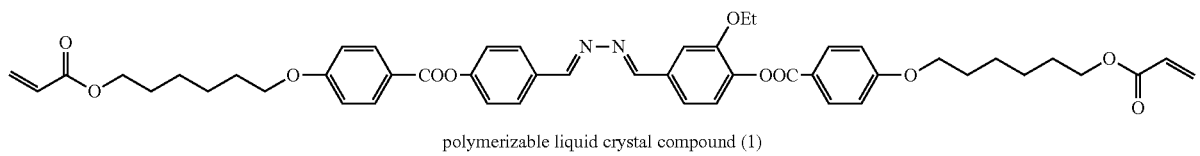

polymerizable liquid crystal compound (1)

As the polymerizable liquid crystal compound (2) shown in Table 1, a liquid crystal compound (refractive index anisotropy: $\Delta n=0.23$) having the following structure was used.

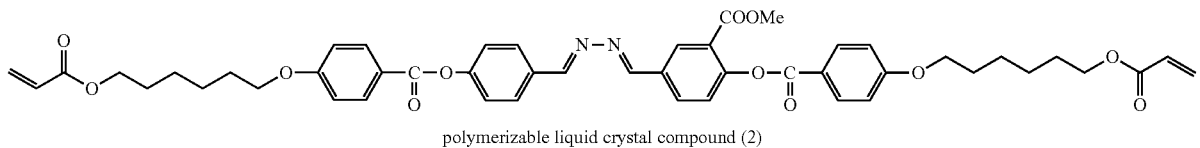 [SMILES: C=CC(=O)OCCCCCCOc1ccc(C(=O)Oc2ccc(/C=N/N=C/c3ccc(OC(=O)c4ccc(OCCCCCCOC(=O)C=C)cc4)c(C(=O)OC)c3)cc2)cc1]

polymerizable liquid crystal compound (2)

As the polymerizable non-liquid crystal compound shown in Table 1, a compound having the following structure was used.

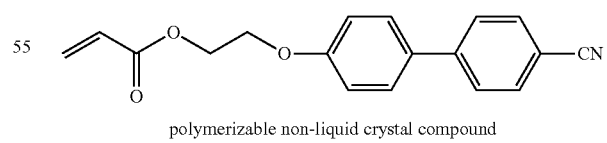

polymerizable non-liquid crystal compound

As the chiral agent shown in Table 1, Paliocolor LC756, a product of BASF, was used.

As the surfactant shown in Table 1, FTERGENT 209, a product of NEOS Company Limited, was used.

As the photo-polymerization initiator shown in Table 1, IRGACURE OXE02, a product of Ciba Japan K.K., was used.

A film formed of an alicyclic olefin polymer (product name: "ZEONOR FILM ZF16-100," product of OPTES Inc.) was prepared, and one side of the film was subjected to rubbing treatment. The polymerizable liquid crystal composition A was applied to the rubbed surface using a #20 wire bar to form a coating layer. The coating layer was subjected to orientation treatment at 130° C. for 2 minutes to form a cholesteric liquid crystal layer having a dry thickness of 10 μm. The cholesteric liquid crystal layer was irradiated with UV light of 2,000 mJ/cm² using a mercury lamp in a nitrogen atmosphere to obtain a film A including a cholesteric resin layer having a thickness of about 10 μm.

The film A was observed under a polarizing microscope. No orientation defects were found, and it was thus confirmed that a transparent cholesteric resin layer with no haze was formed.

A polymerizable liquid crystal composition B shown in Table 1 was prepared similarly, and a film B including a cholesteric resin layer was obtained by the same procedure as that for the film A except that the polymerizable liquid crystal composition B was used. The film B was also observed similarly under a polarizing microscope, and it was confirmed that a transparent cholesteric resin layer with no orientation defects and no haze was formed.

[Formation of Nematic Resin Layer]

Material components used were mixed in a mixing ratio shown in Table 2 to prepare a nematic liquid crystal composition C.

TABLE 2

Constitution of Nematic liquid crystal composition

|  | Nematic liquid crystal composition C | Nematic liquid crystal composition D |
|---|---|---|
| Polymerizable liquid crystal compound (2) | — | 40 |
| Polymerizable liquid crystal compound (3) | 40 | — |
| Surfactant | 0.04 | 0.04 |
| Photo-polymerization initiator | 1.2 | 1.2 |
| Cyclopentanone | 60 | 60 |

In Table 2, the polymerizable liquid crystal compound (2), the surfactant, and the photo-polymerization initiator were the same as those in Table 1.

As the polymerizable liquid crystal compound (3) in Table 2, Paliocolor LC242, a product of BASF (refractive index anisotropy: Δn=0.14), was used.

The nematic liquid crystal composition C was applied to the cholesteric resin layer of the above-produced film A using a #8 wire bar and then subjected to orientation treatment at 80° C. for 3 minutes to form a nematic liquid crystal layer having a dry thickness of 4 μm. The obtained nematic liquid crystal layer was irradiated with UV light of 2,000 mJ/cm² using a mercury lamp in a nitrogen atmosphere to obtain a film C including the nematic resin layer having a thickness of about 4 μm.

The film C was observed under a polarizing microscope. No orientation defects were found, and it was thus confirmed that a transparent nematic resin layer with no haze was formed. It seems that the directors of the cholesteric resin layer on its air interface side were uniform, and this may be the reason that nematic regularity with no orientation defects was obtained without any special orientation treatment.

A film D including a nematic resin layer was obtained by the same procedure as that for the film C except that the nematic liquid crystal composition C was applied to the cholesteric resin layer of the film B instead of the film A. The film D was also observed similarly under a polarizing microscope, and it was confirmed that a transparent nematic resin layer with no orientation defects and no haze was formed.

A nematic liquid crystal composition D shown in Table 2 was prepared in a similar manner. A film E including a nematic resin layer was obtained by the same procedure as that for film D except that the nematic liquid crystal composition D was used instead of the nematic liquid crystal composition C, that a #5 wire bar was used, and that the dry thickness of the nematic resin layer was set to 2.4 μm. The film E was also observed similarly under a polarizing microscope, and it was confirmed that a transparent nematic resin layer with no orientation defects and no haze was formed.

[Formation of Binder Layer]

0.0045 Parts by weight of a pigment (product name: "CROMOPHTAL Violet B," Ciba Japan K.K.), 0.0055 parts by weight of a pigment (product name: "CROMOPHTAL Blue A3R," Ciba Japan K.K.), and 10 parts by weight of ethyl acetate were mixed, and the mixture was subjected to ultrasonic treatment for 30 minutes. Then 5 parts by weight of an adhesive (product name: "SK Dyne 2094," Soken Chemical & Engineering Co., Ltd.) and 0.014 parts by weight of a curing agent (product name: "E-AX," Soken Chemical & Engineering Co., Ltd.) were added to the mixture, and the resultant mixture was stirred to prepare a binder composition.

The obtained binder composition was applied to the nematic resin layer of the film C using a #100 bar and then dried at 100° C. for 1 minute to form a binder layer. Then the formed binder layer was attached to the separately formed film A so that the binder layer faces the cholesteric resin layer of the film A, to obtain a film H.

The nematic resin layer of the film D and the cholesteric resin layer of the film B were laminated through a binder layer in a similar manner to obtain a film I.

The nematic resin layer of the film E and the cholesteric resin layer of the film B were laminated through a binder layer in a similar manner to obtain a film J.

The binder composition was applied to the cholesteric resin layer of the film A using a #100 bar and then dried at 100° C. for 1 minute to form a binder layer. The obtained film will be referred to as a film K.

Example 1

The film H and a 0.7 mm-thick polyvinyl butyral sheet in which tin-doped indium oxide (median diameter: 60 μm) had been dispersed in a concentration of 1 percent by weight were subjected to lamination treatment at 150° C. for 2 minutes to obtain a heat insulating member.

The color tone of the obtained heat insulating member was visually determined and found to be bluish violet, and no haze was found.

The transmission spectrum and reflection spectrum of the obtained heat insulating member were measured in the wavelength range of 300 nm to 2,100 nm using a UV-visible near infrared spectrophotometer (V-570, a product of JASCO Corporation), and a yellow index and hues a* and b* were measured. The appearance was an achromatic color (neutral gray). In addition, visible light transmittance and solar radiation transmittance were measured in accordance with JIS R3106. The results are shown in Table 3.

Example 2

A heat insulating member was obtained by the same procedure as in Example 1 except that the film I was used instead of the film H. The yellow index, hues a* and b*, visible light transmittance, and solar radiation transmittance of the obtained heat insulating member were measured in the same procedure as in Example 1. The results are shown in Table 3.

Example 3

A heat insulating member was obtained by the same procedure as in Example 2 except that antimony-doped tin oxide (median diameter: 60 μm) was used instead of tin-doped indium oxide. The yellow index, hues a* and b*, visible light transmittance, and solar radiation transmittance of the obtained heat insulating member were measured in the same procedure as in Example 1. The results are shown in Table 3.

Example 4

A heat insulating member was obtained by the same procedure as in Example 1 except that the film J was used instead of the film H. The yellow index, hues a* and b*, visible light transmittance, and solar radiation transmittance of the obtained heat insulating member were measured in the same procedure as in Example 1. The results are shown in Table 3.

Example 5

A heat insulating member was obtained by the same procedure as in Example 4 except that antimony-doped tin oxide was used instead of tin-doped indium oxide. The yellow index, hues a* and b*, visible light transmittance, and solar radiation transmittance of the obtained heat insulating member were measured in the same procedure as in Example 1. The results are shown in Table 3.

Example 6

A heat insulating member was obtained by the same procedure as in Example 1 except that the film K was used instead of the film H. The yellow index, hues a* and b*, visible light transmittance, and solar radiation transmittance of the obtained heat insulating member were measured in the same procedure as in Example 1. The results are shown in Table 3.

TABLE 3

Results of Examples 1 to 6

| | Ex. 1 | Ex. 2 | Ex. 3 | Ex. 4 | Ex. 5 | Ex. 6 |
|---|---|---|---|---|---|---|
| Film to which binder was applied | film H | film I | film I | film J | film J | film K |
| Inorganic fine particles contained in resin layer | ITO | ITO | ATO | ITO | ATO | ITO |
| Center wavelength of a band of reflecting 40% or more of incident light (nm) | 1130 | 1100 | 1100 | 1100 | 1100 | 1130 |
| Bandwidth of a band reflecting 40% or more of incident light (nm) | 470 | 440 | 440 | 420 | 420 | 470 |
| Visible light transmittance (%) | 72.5 | 72.2 | 73.1 | 71.2 | 72.1 | 71.5 |
| Solar radiation transmittance (%) | 46.1 | 47.9 | 52.8 | 49.4 | 54.3 | 52.3 |
| Yellow index | 0.94 | −1.43 | −0.88 | −3.20 | −2.17 | 1.91 |
| a* | −0.51 | −1.05 | −0.95 | −0.07 | 0.95 | −1.40 |
| b* | 0.55 | −0.35 | −0.14 | −1.59 | −1.52 | 1.38 |

Examples 7 to 12

Heat insulating members were produced by the same procedure as in Example 2 except that the nematic liquid crystal composition was applied using wire bars as shown in Table 4 in order to change the thickness of the nematic liquid crystal composition. More specifically, films similar to the film D were produced except that different wire bars were used as shown in Table 4 in order to apply the nematic liquid crystal composition C with different dry thicknesses. Then, films similar to the film I were produced except that the resulting films were used instead of the film D. Different insulating members were then produced by the same procedure as in Example 2 except that the obtained films were used instead of the film I.

The visible light transmittance and solar radiation transmittance of each of the obtained heat insulating members were measured. The results are shown in Table 4. In Table 4, a film having a visible light transmittance of 60% or higher was evaluated as "excellent," a film having a visible light transmittance of 50% or higher and 60% or lower was evaluated as "good," and a film having a visible light transmittance of less than 50% was evaluated as "not good." A film having a solar radiation transmittance of 60% or lower was evaluated as "excellent," a film having a solar radiation transmittance of 50% or higher and 60% of lower was evaluated as "good," and a film having a solar radiation transmittance of higher than 60% was evaluated as "not good."

The front retardation Re of each nematic resin layer was determined by multiplying the refractive index anisotropy Δn being 0.14 of the nematic resin layer by the thickness (nm) of the nematic resin layer, and the results are shown in Table 4.

TABLE 4

Results of Examples 7 to 12

| | Ex. 7 | Ex. 8 | Ex. 9 | Ex. 10 | Ex. 11 | Ex. 12 |
|---|---|---|---|---|---|---|
| Number of wire bar used for application | 5 | 6 | 8 | 9 | 10 | 12 |
| Thickness of a nematic resin layer (μm) | 2.5 | 3 | 4 | 4.5 | 5 | 6 |

TABLE 4-continued

Results of Examples 7 to 12

|  | Ex. 7 | Ex. 8 | Ex. 9 | Ex. 10 | Ex. 11 | Ex. 12 |
|---|---|---|---|---|---|---|
| Front retardation (nm) | 350 | 420 | 560 | 630 | 700 | 840 |
| Visible light transmittance | excellent | excellent | excellent | excellent | excellent | excellent |
| Solar radiation transmittance | good | excellent | excellent | excellent | excellent | good |

Example 13

Production of Heat Insulating Laminated Glass and its Heat Insulating Effect

Green glass having a thickness of 2.76 mm was disposed on the tin-doped indium oxide-containing polyvinyl butyral sheet of the heat insulating member produced in Example 2. A polyvinyl butyral sheet and green glass were disposed in this order on the opposite side of the heat insulating member. Then the resultant heat insulating member was heated at 150° C. for 30 minutes to produce heat insulating laminated glass.

The transmission spectrum of the obtained heat insulating laminated glass was measured with the tin-doped indium oxide-containing polyvinyl butyral sheet being disposed on the light emission side relative to the cholesteric resin layer, and hues a* and b* were measured. The results showed that a* was −1.43 and b* was 0.45. The green glass used had hues a* and b* of −0.73 and 0.25, respectively, meaning a green color. Accordingly, it was confirmed that, even when the heat insulating member of the present invention is used to form heat insulating laminated glass, the green appearance can be maintained.

The reflection spectrum of the heat insulating laminated glass was measured to determine solar radiation reflectivity. The solar radiation reflectivity was 28.5%. The reflection spectrum of the heat insulating laminated glass was measured with the cholesteric resin layer being disposed on the light emitting side to determine solar radiation reflectivity. The solar radiation reflectivity was 10.5%. Therefore, when the heat insulating laminated glass is used as heat insulating laminated glass for buildings and vehicles, a higher heat insulating effect can be expected by disposing the cholesteric resin layer on an external light side (i.e., the side close to an infrared source) and disposing the resin layer containing the inorganic fine particles on an interior side of a room or a vehicle (i.e., the side farther from the infrared source).

Industrial Applicability

The heat insulating member of the present invention is suitable for, for example, an intermediate film for heat insulating laminated glass.

The heat insulating laminated glass of the present invention is suitable for, for example, window materials for vehicles or buildings, transparent wall materials, and transparent containers.

Reference Signs List

| 1-6 | heat insulating laminated glass |
|---|---|
| 11, 12 | glass plate |
| 21 | resin layer containing no inorganic fine particles |
| 22 | fine particle-containing resin layer |
| 31 | controlled cholesteric resin layer |
| 32 | controlled cholesteric resin layer |
| 41 | colored binder layer |
| 42, 43 | binder layer containing no pigment |
| 51 | nematic resin layer |
| 61 | orientation film |

The invention claimed is:

1. A heat insulating member comprising:
   at least one cholesteric resin layer having cholesteric regularity controlled such that, in a wavelength range of 800 nm to 2,500 nm, the cholesteric resin layer has a band of reflecting 40% or more of incident light with a wavelength width equal to or wider than 300 nm; and
   a binder layer containing a pigment,
   the heat insulating member having a yellow index of 2.0 or lower.

2. The heat insulating member according to claim 1, comprising an additional resin layer containing inorganic fine particles.

3. The heat insulating member according to claim 1, wherein a visible light transmittance of the heat insulating member is 60% or higher, and a solar radiation transmittance of the heat insulating member is 60% or lower.

4. The heat insulating member according to claim 1, wherein
   the heat insulating member comprises two cholesteric resin layers having the same twisting direction and the same cholesteric regularity, and
   the heat insulating member comprises a nematic resin layer between the two cholesteric resin layers.

5. The heat insulating member according to claim 4, wherein a front retardation of the nematic resin layer at a wavelength of 550 nm is 400 nm or larger and 800 nm or smaller.

6. The heat insulating member according to claim 1, wherein the pigment is at least one pigment selected from the group consisting of azo-based pigments, quinacridone-based pigments, diketo pyrrolo pyrrole-based pigments, anthraquinone-based pigments, dioxazine-based pigments, and phthalocyanine-based pigments.

7. The heat insulating member according to claim 1, wherein the cholesteric resin layer is a resin layer formed by curing a liquid crystal composition containing a liquid crystal compound having a refractive index anisotropy Δn of 0.21 or higher.

8. The heat insulating member according to claim 1, wherein the cholesteric resin layer is formed from a liquid crystal composition containing a compound represented by the formula (1):

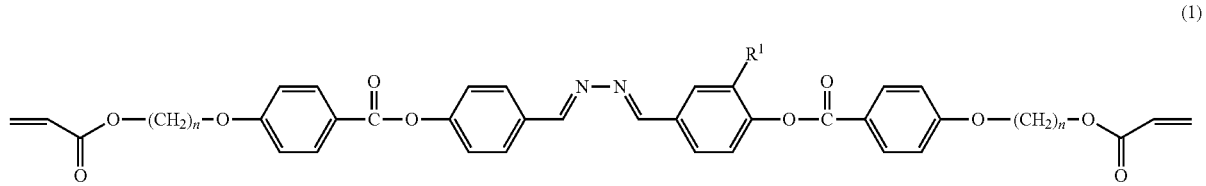

(1)

(in the formula (1), $R^1$ represents any one selected from the group consisting of a hydrogen atom, halogen atoms, alkyl groups having 1 to 10 carbon atoms, $-OR^3$, $-O-C(=O)-R^3$, and $-C(=O)-OR^3$, wherein $R^3$ represents a hydrogen atom or an alkyl group that has 1 to 10 carbon atoms and that may have a substituent, wherein, when $R^3$ is an alkyl group, at least one group selected from the group consisting of $-O-$, $-S-$, $-O-C(=O)-$, $-C(=O)-O-$, $-NR^4-C(=O)-$, $-C(=O)-NR^4-$, $-NR^4-$, $-C(=O)-$, and combinations thereof may lie in the alkyl group (excluding a case in which two or more $-O-$'s or $-S-$'s lie adjacently), wherein $R^4$ represents a hydrogen atom or an alkyl group having 1 to 6 carbon atoms, and n's each independently represent an integer of from 2 to 12).

10. The heat insulating member according to claim 8, wherein the compound represented by the formula (1) is a compound represented by the formula (2):

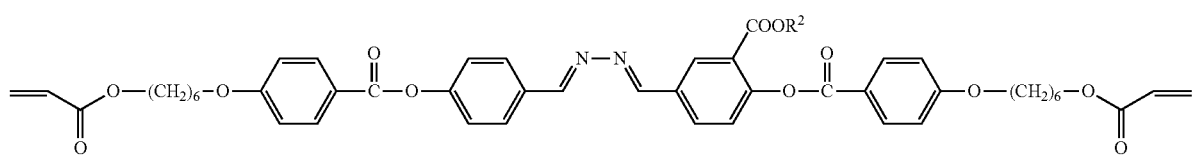

(2)

$-NR^4-C(=O)-$, $-C(=O)-NR^4-$, $-NR^4-$, $-C(=O)-$, and combinations thereof may lie in the alkyl group (excluding a case in which two or more $-O-$'s or $-S-$'s lie adjacently), wherein $R^4$ represents a hydrogen atom or an alkyl group having 1 to 6 carbon atoms, and n's each independently represent an integer of from 2 to 12).

9. The heat insulating member according to claim 4, wherein the nematic resin layer is formed from a liquid crystal composition containing a compound represented by the formula (1):

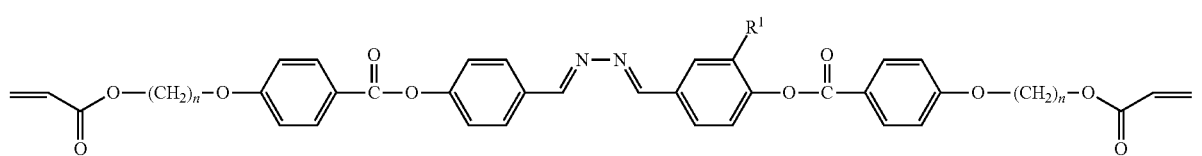

(1)

(in the formula (1), $R^1$ represents any one selected from the group consisting of a hydrogen atom, halogen atoms, alkyl groups having 1 to 10 carbon atoms, $-OR^3$, $-O-C(=O)-R^3$, and $-C(=O)-OR^3$, wherein $R^3$ represents a hydrogen atom or an alkyl group that has 1 to 10 carbon atoms and that may have a substituent, wherein, when $R^3$ is an alkyl group, at least one group selected from the group consisting of $-O-$, $-S-$, $-O-C(=O)-$, $-C(=O)-O-$, (in the formula (2), $R^2$ represents an alkyl group having 1 to 10 carbon atoms, and at least one group selected from the group consisting of $-O-$, $-S-$, $-O-C(=O)-$, $-C(=O)-O-$, and combinations thereof may lie in the alkyl group (excluding a case in which two or more $-O-$'s or $-S-$'s lie adjacently).

11. The heat insulating member according to claim 9, wherein the compound represented by the formula (1) is a compound represented by the formula (2):

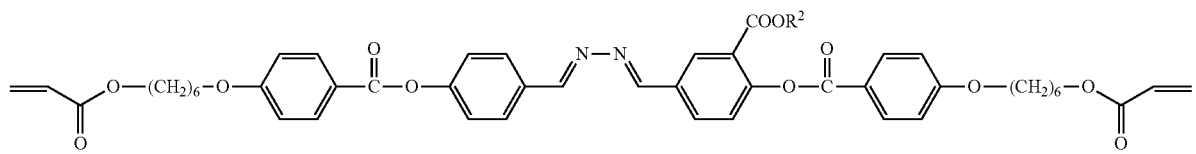

(2)

(in the formula (2), $R^2$ represents an alkyl group having 1 to 10 carbon atoms, and at least one group selected from the group consisting of —O—, —S—, —O—C(=O)—, —C(=O)—O—, and combinations thereof may lie in the alkyl group (excluding a case in which two or more —O—'s or —S—'s lie adjacently).

12. The heat insulating member according to claim 2, wherein the inorganic fine particles are one or both of metal oxide fine particles and hexaboride fine particles.

13. The heat insulating member according to claim 2, wherein the additional resin layer containing the inorganic fine particles contains polyvinyl butyral or an ethylene-vinyl acetate copolymer.

14. A heat insulating laminated glass comprising:
two glass plates; and
the heat insulating member according to claim 1, the heat insulating member being provided between the two glass plates.

15. A heat insulating laminated glass article comprising:
two glass plates;
at least one cholesteric resin layer provided between the two glass plates and having cholesteric regularity controlled such that, in a wavelength range of 800 nm to 2,500 nm, the cholesteric resin layer has a band of reflecting 40% or more of incident light with a wavelength width equal to or wider than 300 nm;
a resin layer containing inorganic fine particles; and
a binder layer containing a pigment, wherein
at least one of the cholesteric resin layer is positioned between the resin layer containing the inorganic fine particles and an infrared source.

* * * * *